(12) United States Patent
Stinson, III

(10) Patent No.: US 9,043,607 B2
(45) Date of Patent: *May 26, 2015

(54) SYSTEMS AND METHODS FOR PROVIDING A SPATIAL-INPUT-BASED MULTI-USER SHARED DISPLAY EXPERIENCE

(71) Applicant: Verizon Patent and Licensing Inc., Arlington, VA (US)

(72) Inventor: Willis D. Stinson, III, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,881

(22) Filed: Aug. 22, 2013

(65) Prior Publication Data
US 2013/0339869 A1 Dec. 19, 2013

Related U.S. Application Data

(63) Continuation of application No. 12/703,892, filed on Feb. 11, 2010, now Pat. No. 8,522,308.

(51) Int. Cl.
| *G06F 21/00* | (2013.01) |
| *G06F 3/0484* | (2013.01) |
| *G06F 3/01* | (2006.01) |
| *G06F 3/03* | (2006.01) |
| *G06F 21/32* | (2013.01) |

(52) U.S. Cl.
CPC .............. *G06F 3/0484* (2013.01); *G06F 3/011* (2013.01); *G06F 3/017* (2013.01); *G06F 3/0304* (2013.01); *G06F 21/32* (2013.01)

(58) Field of Classification Search
CPC ..... G06F 21/31; G06F 21/00; G06F 21/6213; G06F 21/32; G06F 3/011; G06F 21/0484; G06F 3/0304; H04L 63/08; H04L 63/10; H04L 63/083; G06K 9/00362
See application file for complete search history.

(56) References Cited

U.S. PATENT DOCUMENTS

| 7,003,728 | B2 * | 2/2006 | Berque | 715/753 |
| 7,327,858 | B2 * | 2/2008 | Weiss | 382/115 |
| 7,464,338 | B2 * | 12/2008 | Sato | 715/750 |
| 7,814,429 | B2 * | 10/2010 | Buffet et al. | 715/763 |
| 2002/0090146 | A1 * | 7/2002 | Heger et al. | 382/291 |
| 2008/0002860 | A1 * | 1/2008 | Super et al. | 382/114 |
| 2009/0079813 | A1 * | 3/2009 | Hildreth | 348/14.03 |

* cited by examiner

*Primary Examiner* — Yin-Chen Shaw
*Assistant Examiner* — Ghodrat Jamshidi

(57) ABSTRACT

An exemplary system includes a spatial input subsystem configured to detect gestures made by a plurality of users within a physical user space associated with a display screen. The system further includes a shared display subsystem communicatively coupled to the spatial input subsystem and configured to authenticate the plurality of users by identifying a plurality of user identities corresponding to the plurality of users based on characteristics of the plurality of hands, and execute a multi-user shared display session that provides the plurality of authenticated users with concurrent control of a display on the display screen. Corresponding systems and methods are also described.

20 Claims, 21 Drawing Sheets

SYSTEMS AND METHODS FOR PROVIDING A SPATIAL-INPUT-BASED MULTI-USER SHARED DISPLAY EXPERIENCE

RELATED APPLICATIONS

This application is a continuation application of U.S. patent application Ser. No. 12/703,892, filed on Feb. 11, 2010, and entitled SYSTEMS AND METHODS FOR PROVIDING A SPATIAL-INPUT-BASED MULTI-USER SHARED DISPLAY EXPERIENCE, which is hereby incorporated by reference in its entirety.

BACKGROUND INFORMATION

As display device technologies have advanced, increasingly large sizes of display devices such as flat-screen computer monitors and televisions have become available to consumers. Nevertheless, traditional uses of display devices, such as computer monitors and televisions, have remained personal experiences controlled by a single user. For example, a person utilizing a computer to surf the World Wide Web ("Web") typically has full and exclusive control of the operation of the computer (via a mouse and keyboard attached to the computer) and, consequently, of the content displayed on a computer monitor driven by the computer. Another person looking over the shoulder of the person surfing the Web has no direct control over the operation of the computer and is therefore relegated to simply watching and/or providing suggestions as the person surfing the Web singularly controls the experience. This can be a frustrating experience when the Web surfing choices made by the person in control of the computer are not the same as the choices that the other person would have made. As another example, although watching television programming is often an activity shared by multiple people, the person holding the television remote control device has singular control over the viewing experience. This, too, can be a frustrating experience when the television viewing choices made by the person in control of the television remote control device are not the same as the choices that another person would have made.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
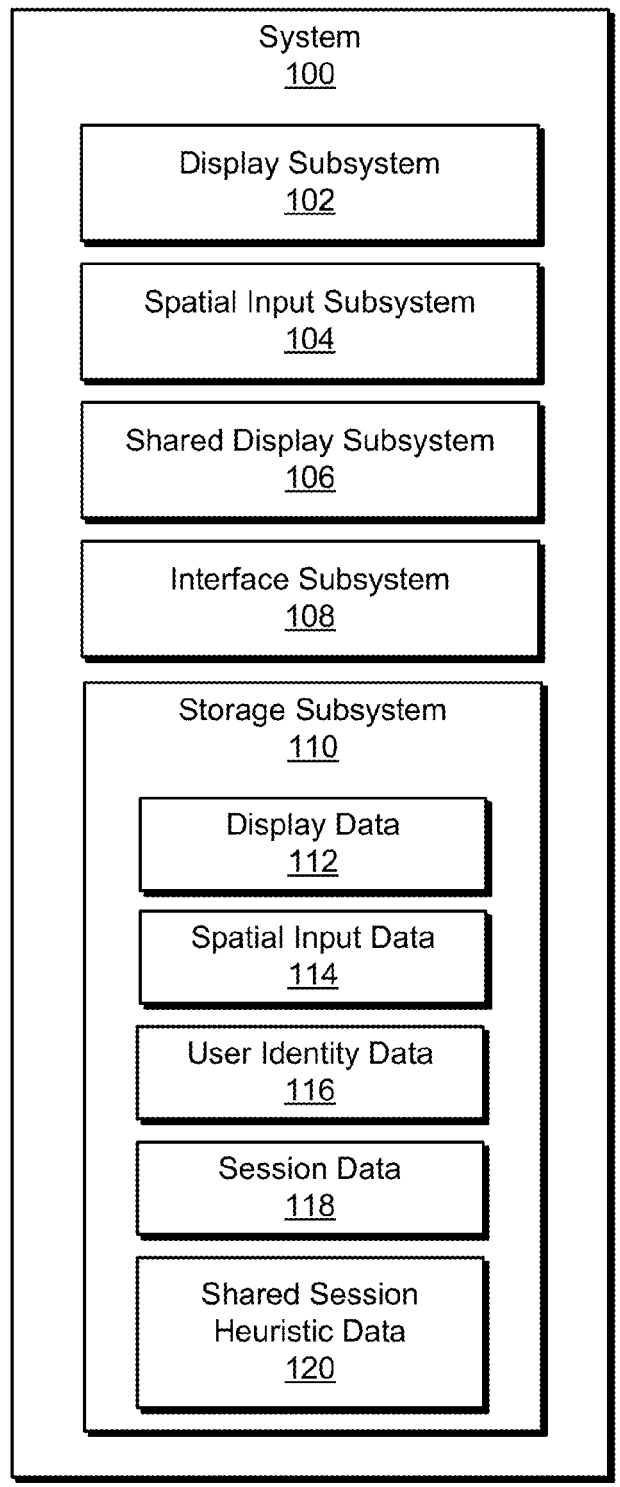
FIG. 1 illustrates an exemplary system configured to provide a spatial-input-based multi-user shared display experience according to principles described herein.

Exemplary systems and methods for providing a spatial-input-based multi-user shared display experience are disclosed herein. As described in more detail further below, one or more of the exemplary systems and methods disclosed herein may enable multiple users to share control of a display presented on a display screen. For example, an exemplary system may be configured to detect user input (e.g., gestures) provided by multiple users, authenticate the users, execute a multi-user shared display session that provides the authenticated users with concurrent control of a display on a display screen through the detected gestures, and manage, based on a shared session heuristic, how at least one resource associated with the display is shared between the authenticated users during the multi-user shared display session.

Accordingly, multiple users may operate together and/or interact by sharing control of a display on a display screen. In certain implementations, for example, multiple users may concurrently control a display presented on a television or a computer monitor by providing spatial input that may be detected and used to determine one or more display operations. As a result, surfing the web, watching television, or any other activity associated with a display screen may be an experience shared by multiple users who have concurrent control of the display screen and/or the activity as opposed to an experience in which only one of the users has control of the display screen and/or the activity at any given time.

As used herein, a resource associated with a display (also referred to herein as a "display resource") may include, but is not limited to, screen space of a display screen on which the display is presented, one or more defined regions of the display screen (which may be referred to as "screen zones"), memory and/or processing resources of a computing device driving the display, applications running on and/or accessible by a computing device driving the display, content presented in the display (which may be referred to as "display content"), and any other resource associated with a display presented on a display screen of a display device. Display content may include graphical assets (e.g., frames, windows, cursors, and other graphical objects) presented in the display, application content presented in the display, media content presented in the display, and any other content presented in the display. Media content may include, without limitation, any television program, on-demand media program, pay-per-view media program, broadcast media program (e.g., broadcast television program), IPTV media content, advertisement (e.g., commercial), video, movie, video game, image, photograph, or any segment, component, or combination of these or other forms of media content that may be displayed for viewing by a user. Application content may include any content associated with an application running on a computing device, such as server-based application content, content associated with applications that execute on a local processor, video game content, web-based content like webpage content, and any combination or sub-combination thereof that may be displayed for viewing by one or more users.

As mentioned, a sharing of such resources between users may be managed based on a shared display heuristic, which may include data specifying one or more rules configured to govern how the display resources are to be shared between users included in a multi-user shared display session. Examples of such rules are described in detail further below.

Exemplary systems and methods for providing a spatial-input-based multi-user shared display experience will now be described in reference to the drawings.

FIG. 1 illustrates an exemplary multi-user shared display system 100 (e.g., or simply "system 100") configured to provide a spatial-input-based multi-user shared display experience. System 100 may include, but is not limited to, a display subsystem 102, a spatial input subsystem 104, a shared display subsystem 106, an interface subsystem 108, and a storage subsystem 110, which may be communicatively coupled to one another using any suitable technologies.

Display subsystem 102 may include a display device configured to provide a display on a display screen of the display device for viewing by a user. The display device may include, without limitation, a television, a computer monitor, or other display device having a display screen on which a display may be presented for viewing by one or more users. A display may include any combination and/or layout of display content, including any of the types of display content described above. Data representative of display content may be stored as display data 112 in storage subsystem 110 and/or accessed from another content source.

Display subsystem 102 may include any hardware, firmware, and/or software configured to facilitate a display of content on a display screen for viewing by one or more users. For example, display subsystem 102 may include a display device, display screen, display driver(s), graphics engine, and/or other components configured to provide and/or control a display on a display screen. In certain embodiments, display subsystem 102 may include one or more components of a computing device such as a set-top box or a personal computer that are configured to generate and provide data representative of display content to a display device such as a television or a computer monitor for display on a display screen of the display device.

Spatial input subsystem 104 may be configured to perform any of the spatial input operations and applications described herein. Spatial input may include any user input that is provided by a user within a physical user space associated with a display screen and that may be detected by spatial input subsystem 104. In certain embodiments, spatial input may be provided by one or more users within the physical user space associated with the display screen without the users having to hold or otherwise utilize user input devices within the physical user space. For example, one or more users may perform gestures, such as hand gestures, within the physical user space, and spatial input subsystem 104 may detect the gestures. Spatial input subsystem 104 may be able to detect spatial input in any suitable way, including, for example, by employing two-dimensional and/or three-dimensional spatial sensing technologies capable of detecting spatial input within the physical user space associated with the display screen. For instance, spatial input subsystem 104 may include a single video camera, a stereo vision video camera, an array of video cameras, one or more infrared cameras, one or more time-of-flight sensors, one or more motion detectors, any other spatial input sensing technologies, and any combination or sub-combination thereof positioned relative to a display screen so as to monitor the physical user space associated with the display screen. An exemplary physical user space associated with a display screen is described in more detail further below.

Certain examples described herein are described in reference to spatial input subsystem 104 being configured to visually detect user input such as gestures performed by one or more users within a physical user space associated with a display screen. These examples are illustrative only. Other spatial input detection technologies, including any of those listed above, may be employed in addition or alternative to the visual input detection technologies described herein.

In certain embodiments, for example, spatial input subsystem 104 may be configured to visually detect user input provided by one or more users. To this end, spatial input subsystem 104 may be configured to visually monitor a physical user space associated with a display screen. Such a physical user space may include a three-dimensional space in which one or more users may be typically located when viewing the display screen. In certain embodiments, for instance, spatial input subsystem 104 may include one or more video cameras positioned relative to the display screen and configured to capture images of a physical user space located in front of the display screen. In some examples, the monitored physical user space may substantially coincide with a field of view of one or more cameras. To illustrate, spatial input subsystem 104 may include a single Charge-Coupled Device ("CCD") or CMOS-sensor camera configured for two-dimensional sensing, a stereo vision camera for three-dimensional sensing, or an array of cameras for higher-fidelity three-dimensional sensing.

In certain embodiments, visually detected user input may include one or more gestures made by one or more users within the physical user space. For example, one or more users may act out one or more gestures, such as hand gestures, within the physical user space. Spatial input subsystem 104 may visually detect such gestures made within the physical user space. Examples of user input gestures are described in more detail further below.

Spatial input subsystem 104 may be further configured to identify and apply predefined input commands associated with visually detected user input. For example, spatial input subsystem 104 may visually detect user input such as one or more gestures, identify predefined input commands associated with the detected gestures, and initiate execution of one or more operations based on the predefined input commands. The gestures may be predefined and/or learned. Spatial input subsystem 104 may be configured to learn gestures to detect and accommodate differences in how users physically perform canonical, predefined gestures and/or to allow users to define custom gestures according to personal abilities and/or preferences. In some examples, the input commands may be configured to initiate operations that may control a display device, including a display presented on a display screen of the display device.

To support spatial-input-based control of operations of system 100, spatial input such as one or more user gestures may be predefined and associated with particular input commands (e.g., display screen input commands). Data representative of the predefined gestures may be stored as spatial input data 114 in storage subsystem 110 such that a detected gesture may be compared to one or more of the predefined gestures represented by spatial input data 114. When a comparison is made and a match is found, one or more input commands associated with the matching predefined gesture may be applied by spatial input subsystem 104 such that system 100 may consider the input command(s) and/or perform one or more operations in response to the input command(s).

As an example, a particular hand gesture may be predefined and associated with a user input command such as a user request to access system 100 (e.g., a request to login to system 100). Data representative of the predefined hand gesture may be stored as spatial input data 114 in storage subsystem 110. Subsequently, spatial input subsystem 104 may detect a hand gesture made by a user within the monitored physical user space, compare the detected hand gesture to spatial input data 114 representative of predefined hand gestures, determine that the detected hand gesture matches the predefined hand gesture associated with a user request to access system 100, determine that the predefined hand gesture is associated with a user request to access system 100, and apply the user access request such as by providing the user access request to one or more other components of system 100 to initiate one or more user access operations (e.g., user login and/or authentication operations).

In certain exemplary embodiments, spatial input subsystem 104 may be configured to visually detect user input gestures without the user having to hold, be attached to, or otherwise utilize a user input device. For example, a user may be able to use only his body to act out gestures that may be visually detected by spatial input subsystem 104. In some examples, a user may use one or more of his hands to act out hand gestures that may be visually detected by spatial input subsystem 104, without the user having to hold a user input device such as a remote control device, a mouse, a marker, or other input device.

Shared display subsystem 106 may be configured to perform any of the shared display operations described herein, including executing a multi-user display sharing session associated with a display and controlling, based on a shared session heuristic, how at least one resource associated with the display is shared between users during the multi-user display sharing session. Accordingly, one or more users may share control of one or more resources associated with the display by providing user input that may be visually detected and applied by spatial input subsystem 104 as described herein. Shared display subsystem 106 may interact with spatial input subsystem 104, including receiving user input commands from spatial input subsystem 104 and controlling, based on the shared session heuristic, how at least one resource associated with the display is shared between multiple users during execution of the multi-user display sharing session.

To support the execution and management of a multi-user shared display session and the controlling of how at least one resource of the display is shared between users during the session, shared display subsystem 106 may manage user identities, which may include authenticating and tracking users based on visually detected input. For example, when a user provides visually detected input, shared display subsystem 106 may identify a user identity based on the visually detected input, associate the user identity with the visually detected input, and control how display resources are shared during a multi-user shared display session based at least in part on the user identity. Examples of identifying and associating user identities with user input, as well as examples of basing sharing of display resources on user identities are described further below.

Shared display subsystem 106 may be further configured to create, manage, and terminate display sessions and user sessions. When multiple user sessions are added to a display session, the display session may be referred to a multi-user shared display session that is configured to provide concurrent control of a display to multiple users.

Shared display subsystem 106 may be further configured to control how display resources are shared between users during a multi-user shared display session. For example, shared display subsystem 106 may control how physical screen space of a display screen on which the display is provided is allocated and/or re-allocated between multiple users participating in the multi-user shared display session. The manner in which resources are shared may be determined by shared display subsystem 106 based on a shared display heuristic, visually detected user input, user identities of the users participating in the session, and/or other factors that may facilitate sharing of display resources between multiple users who share control of a display. Examples of how the sharing of display resources may be governed during a multi-user shared display session are described further below.

To support the management and control of a multi-user shared display session and/or the sharing of display resources, shared display subsystem 106 may be configured to maintain and access user identity data 116, session data 118, and shared session heuristic data 120 stored in storage subsystem 110. User identity data 116 may include any information about one or more users who may participate and/or who are participating in a multi-user shared display session. For example, user identity data 116 may include authentication information that may be used to authenticate users to system 100. Session data 118 may include any information about an active display session such as a multi-user shared display session and/or one or more user sessions that are part of a multi-user shared display session. Shared session heuristic data 120 may include any data representative of a shared session heuristic that may be configured for use by shared display subsystem 106 to determine how to control sharing of one or more display resources between multiple users during a multi-user shared display session.

Interface subsystem 108 may be configured to provide one or more interfaces between display subsystem 102, spatial input subsystem 104, shared display subsystem 106, and any computing hardware, firmware, and/or software associated with system 100. For example, interface subsystem 108 may provide an interface by which display subsystem 102, spatial input subsystem 104, and/or shared display subsystem 106 may communicate with an operating system and/or display content managers (e.g., application and/or media content managers) of a computing device. Interface subsystem 108 may include and/or employ any suitable technologies to provide such interfaces.

Storage subsystem 110 may store electronic data maintained and/or accessible by display subsystem 102, spatial input subsystem 104, shared display subsystem 106, and/or interface subsystem 108. Storage subsystem 110 may include one or more data storage media, devices, or configurations and may employ any type, form, and combination of data storage media and/or devices. For example, storage subsystem 110 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage subsystem 110.

System 100, including facilities 102-110, may include any computer hardware and/or computer-implemented instructions (e.g., firmware and/or software), or combinations of computer-implemented instructions and hardware, configured to perform one or more of the processes described herein. In particular, system 100 may be implemented on one physical computing device or may be implemented on more than one physical computing device. Accordingly, system 100 may include or be implemented on any number of computing devices. Moreover, it will be recognized that although facilities 102-110 are shown to be separate facilities in FIG. 1, any of those facilities may be combined into a single facility as may serve a particular application.

Accordingly, one or more of the processes described herein may be implemented at least in part as instructions executable by one or more appropriately configured computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 2:
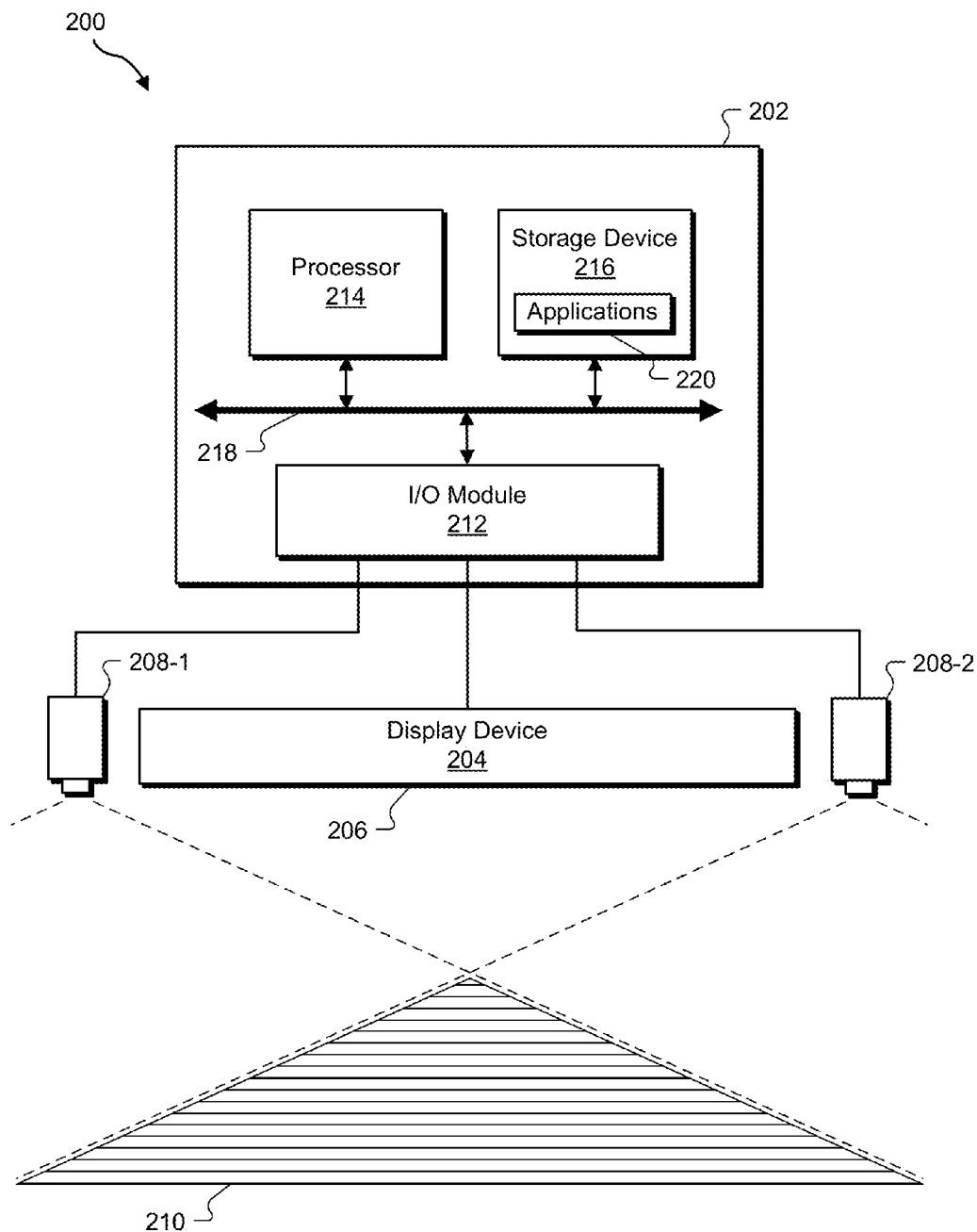
FIG. 2 illustrates a top view an exemplary implementation of the system of FIG. 1 according to principles described herein.

FIG. 2 illustrates a top view of an exemplary implementation 200 of system 100 in which a computing device 202 may be communicatively coupled to and configured to drive a display device 204 by providing one or more signals that may be utilized by display device 204 to generate and provide a display on a display screen 206 of display device 204. Computing device 202 may also be communicatively coupled to and configured to receive input signals from a set of sensing devices 208 (e.g., sensing devices 208-1 and 208-2) that are strategically positioned relative to display screen 206 (e.g., a certain distance from either side of display device 204). Each sensing device 208 may be configured to sense spatial input provided within a sensing space. A sensing space associated with each sensing device 208 is delineated by dashed lines extending away from each sensing device 208 in FIG. 2. An intersection of the sensing spaces associated with sensing devices 208 may form an overall sensing space 210 for the set of sensing devices 208. In FIG. 2, the overall sensing space 210 is depicted by a pattern of horizontal lines within an area of intersection of the sensing spaces of sensing devices 208-1 and 208-2. FIG. 2 shows a top view of the overall sensing space 210, which may be a three-dimensional space positioned in front of the display screen 206 of display device 204. Sensing devices 208 may be positioned such that the overall sensing space 210 includes and/or coincides with a physical user space typically occupied by one or more users when viewing the display screen 206 of display device 204. In certain embodiments, sensing devices 208 may be physically integrated within display device 204. In other embodiments, sensing devices 208 may be physically separate from display device 204.

In certain embodiments, sensing devices 208 may include a set of video cameras, which may be referred to as cameras 208 herein. Each camera in the set of cameras 208 may be configured to capture video frame images within a field of view of the camera. In such embodiments, a field of view associated with each camera is delineated by dashed lines extending from each camera in FIG. 2. An intersection of the views associated with the cameras may form an overall field of view for the set of cameras. In FIG. 2, the overall field of view is depicted by a pattern of horizontal lines within an area of intersection of the viewing fields of the cameras. FIG. 2 shows a top view of the overall field of view, which may be a three-dimensional space positioned in front of the display screen 206 of display device 204. Cameras may be positioned such that the overall field of view includes and/or coincides with a physical user space typically occupied by one or more users when viewing the display screen 206 of display device 204. In certain embodiments, the cameras may be physically integrated within display device 204. In other embodiments, the cameras may be physically separate from display device 204. While FIG. 2 illustrates a two-camera sensing configuration that allows for three-dimensional sensing, this is illustrative only. Other configurations may be used in other embodiments. For example, a single-camera configuration may be employed and used for two-dimensional sensing.

Display device 204 may include any device configured to provide a display, the control of which may be shared by multiple users during a multi-user shared display session. Computing device 202 may include any device configured to drive display device 204 and execute and control a multi-user shared display session based on visually detected input as described herein. In certain embodiments, computing device 202 may include a set-top box and display device 204 may include a television connected to the set-top box. In other embodiments, computing device 202 may include a computer and display device 204 may include a monitor connected to the computer. In yet other embodiments, computing device 202 may include a gaming console and display device 204 may include a television or other display device connected to the gaming console. In yet other embodiments, computing device 202 may include a mobile computing device such as a mobile phone or mobile entertainment device.

Computing device 202 may include an input/output ("I/O") module 212, a processor 214, and a storage device 216 communicatively coupled one to another via a communication infrastructure 218. The components of computing device 202 may communicate with one another, including sending data to and receiving data from one another, using any suitable communication technologies. While exemplary components of computing device 202 are shown in FIG. 2, the components illustrated in FIG. 2 are not intended to be limiting. Additional or alternative components may be used in other embodiments. Components of the computing device 202 shown in FIG. 2 will now be described in additional detail.

I/O module 212 may be configured to transmit output signals and receive input signals to/from one or more other devices. For example, I/O module 212 may be configured to receive camera image data from cameras 208 and to output display signals to display device 204 for use by display device 204 to generate a display on display screen 206. I/O module 212 may include any suitable hardware, firmware, and/or software for transmitting output signals and receiving input signals to/from display device 204 and cameras 208. I/O module 212 may be connected to display device 204 and cameras 208 using any suitable technologies, such as IEEE 1394, DVI, HDMI, VGA, component video, Ethernet, USB, wireless, analog, digital, and/or other connections.

Processor 214 generally represents any type or form of processing unit capable of processing data or interpreting, executing, and/or directing execution of one or more of the instructions, processes, and/or operations described herein. Processor 214 may direct execution of operations in accordance with one or more applications 220 or other computer-executable instructions such as may be stored in storage device 216 or another computer-readable medium. As an example, processor 214 may be configured to process data, including processing raw image data received from cameras 208.

Storage device 216 may include one or more data storage media, devices, or configurations and may employ any type, form, and combination of data storage media and/or device. For example, storage device 216 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 216. For example, data representative of one or more executable applications 220 configured to direct processor 214 to perform any of the operations described herein may be stored within storage device 216.

In some examples, display subsystem 102, spatial input subsystem 104, shared display subsystem 106, interface subsystem 108, and/or storage subsystem 110 may be partially or fully implemented by or within one or more components of computing device 202. For example, one or more applications 220 residing within storage device 216 may be configured to direct processor 214 to perform one or more processes or functions associated with display subsystem 102, spatial input subsystem 104, and/or shared display subsystem 106. Likewise, storage subsystem 110 may be implemented by or within storage device 216. For example, display data 112, spatial input data 114, user identity data 116, session data 118, and/or shared session heuristic data 120 may be stored within storage device 216.

Figure 3:
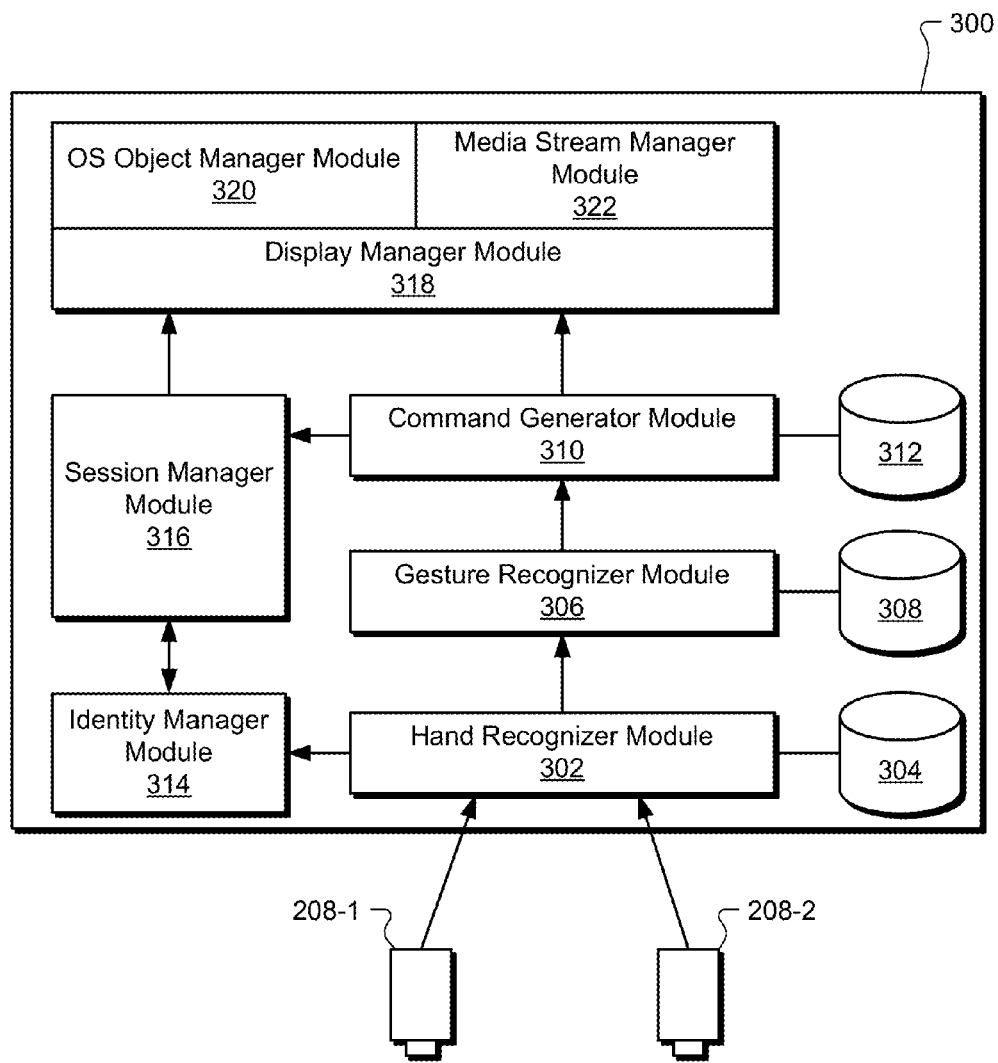
FIG. 3 illustrates an exemplary configuration of modules that may be included in the system of FIG. 1 and/or the implementation of FIG. 2 according to principles described herein.

FIG. 3 illustrates an exemplary configuration 300 of modules that may be included in or implemented by system 100 and/or computing device 202. In certain embodiments, for example, one or more modules within configuration 300 may be implemented as computer-readable instructions (e.g., as applications 220) that may be stored in storage device 216 and configured to direct processor 214 of computing device 202 to perform one or more of the operations described herein.

As shown in FIG. 3, configuration 300 may include a hand recognizer module 302 coupled to a hand reference data store 304, a gesture recognizer module 306 coupled to a gesture reference data store 308, a command generator module 310 coupled to a command reference data store 312, an identity manager module 314, a session manager module 316, a display manager module 318, an operating system ("OS") object manager module 320, and a media stream manager module 322. In certain embodiments, hand recognizer module 302, gesture recognizer module 306, and command generator module 310, which may be part of spatial input subsystem 104, may be configured to visually detect user hand gestures performed (e.g., acted out) in a physical user space monitored by cameras 208 and identify and apply user input commands corresponding to the hand gestures. Identity manager module 314, session manager module 316, and display manager module 318, which may be part of shared display subsystem 106, may be configured to execute a display session such as a multi-user shared display session and control how one or more resources of a display are shared between multiple users during execution of the multi-user shared display session. OS object manager module 320 and media stream manager module 322, which may be part of interface subsystem 108, may be configured to interface with an operating system and/or a media stream manager such as may run on or be accessible by computing device 202. Each of the modules shown in FIG. 3 will be described in detail herein.

Hand recognizer module 302 may be configured to receive and process images captured by cameras 208. For example, raw image data captured by cameras 208 may be received and stored in frame buffers. Hand recognizer module 302 may process the images in the frame buffers in real time, such as by performing an isochronous transformation function that converts raw camera data into recognizable hand objects. For example, starting with raw camera input data B at time t, $B_t=(b_{1t}, b_{2t})$, where $b_{1t}$ represents a frame buffer of camera 208-1 at time t and $b_{2t}$ represents a frame buffer of camera 208-2 at time t, a first transformation function h( ) may be performed by hand recognizer module 302 to convert the raw image data B into recognized hand objects. A given hand at time t may be described as $H_t=h(B_t, R_h)=(u, c)$, where u represents a user identifier, c represents a hand configuration vector, and $R_h$ represents hand reference models stored in hand reference data store 304.

The function h( ) may be computed in any way suitable for converting raw image data captured by cameras 208 into data representative of recognized hand objects. In certain embodiments, for example, an execution of function h( ) may include using edge detection heuristics in combination with feature extraction heuristics (e.g., scaled Euclidean distance from a class mean, nearest neighbor search, and/or decision tree heuristics) to detect individual finger segments of a hand, a palm of a hand, a back of a hand, and/or other fixed shapes of a hand. The function h( ) may also be configured to consider basic affine transformations (e.g., scale, rotation, and translation) to account for movement and/or orientation of a hand relative to cameras 208. Detected parts of a hand may be compared with reference hand object models stored in hand reference data store 304 to identify matching hand parts, to connect hand parts together, to generate a vector of hand reference points H, and to identify a matching hand configuration.

Figure 4:
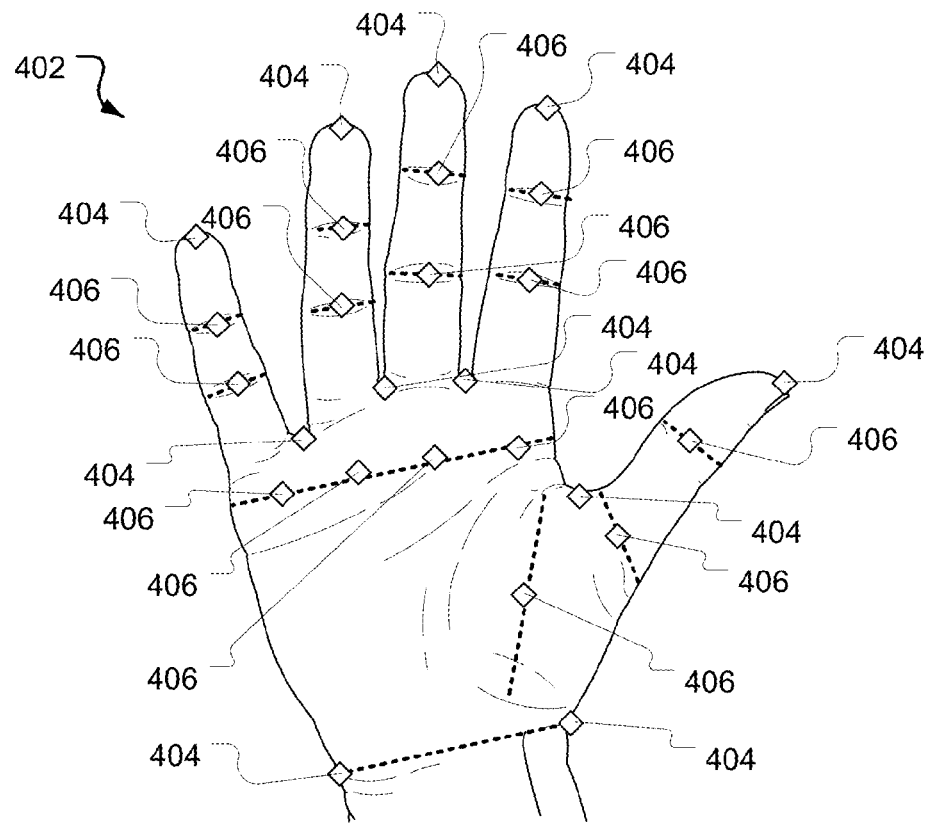
FIG. 4 illustrates an exemplary set of hand reference points in association with a hand according to principles described herein.

When a sufficient number of connected hand parts are detected, hand recognizer module 302 may generate a vector of hand reference points H, and compute a correspondence between reference points in the two frame buffers associated with cameras 208. Because the relative orientation of cameras 208 is known, corresponding points may be computed by using the epipolar constraint. FIG. 4 illustrates an exemplary set of hand reference points in association with a hand 402. As shown, the set of hand reference points may include edge reference points 404 and pivot reference points 406. Edge reference points 404 may include points along an edge (e.g., a straight, curved, and/or corner edge) of a hand, and pivot reference points 406 may include points of articulation on joints of a hand. The vector of hand reference points H may be compared with reference hand configurations stored in hand reference data store 304 to identify a matching hand configuration.

Parts of a hand such as the hand 402 shown in FIG. 4 may be occluded from detection by cameras 208. Accordingly, a match of a detected hand (e.g., a vector of hand reference points H) with a reference hand model (i.e., a matching hand configuration) stored in hand reference data store 304 may be based on incomplete data and/or may utilize image flow heuristics configured to hypothesize the existence and/or orientation of occluded parts of the hand.

Hand recognizer module 302 may be configured to output data indicating when hands visually detected in sensing space 210 match one or more user hand reference models stored in hand reference data store 304. Hand recognizer module 302 may be configured to provide output to gesture recognizer module 306, including output indicating that a match has been identified and/or data representative of a generated vector of hand reference points H at time t.

Gesture recognizer module 306 may be configured to detect hand gestures based on data representative of sequences of detected hand configurations, which may be represented by vectors of hand reference points H received from hand recognizer module 302. In certain embodiments, gesture recognizer module 306 may be configured to perform an isochronous transformation function g( ) that converts sequences of hand objects into recognizable gestures. For example, a given gesture G that began at time t and continued through time t+n may be described by $G_{t+n}=g([H_t, H_{t+n}], R_g)$, where $R_g$ represents gesture reference models stored in gesture reference data store 308.

The function g( ) may be computed in any way suitable for converting sequences of visually detected hand objects into recognizable gestures. In certain embodiments, for example, an execution of function g( ) may include comparing a sequence of hand object vectors $H_t$ through $H_{t+n}$ with reference gestures stored in gesture reference data store 308 to identify a match. When a match is identified, gesture recognizer module 306 may generate and output data representative of the gesture G to command generator module 310.

Command generator module 310 may be configured to identify one or more user input commands based on data representative of gestures, which may include data representative of a gesture G received from gesture recognizer module 306. Command generator module 310 may identify a command C associated with a gesture G by using data representative of the gesture G to identify command C in a lookup table that provides a mapping of gestures to corresponding user input commands. This may be accomplished by command generator module 310 executing a lookup function c( ) to identify command C based on gesture G and a command reference table $R_c$ stored in command reference data store 312 as described by $C=c(G, R_c)$.

Gestures may be acted out by users within a visually monitored user space to control and/or participate in a multi-user shared display session and/or to otherwise control a display. Accordingly, multiple users located within the sensing space 210 shown in FIG. 2 may act out gestures to input commands for use by computing device 202 to control a multi-user shared display session and/or a display. Exemplary gestures and corresponding user input commands will now be described.

In certain embodiments, gestures may be mapped to commands for requesting to login to a session (e.g., a multi-user shared display session, a user session, and/or a display control session), to logout from a session, to invite another user to a multi-user shared display session, to un-invite another user from a multi-user shared display session, to block another user from a multi-user shared display session, to unblock another user from a multi-user shared display session, to transfer a user to/from a multi-user shared display session, to create a frame in a display, to resize a frame in a display, to create a window in a display, to move a window in a display, to resize a window in a display, to delete a frame or a window from a display, to maximize a size of a frame or window in a display, to return a maximized frame or window to a previous state in the display (e.g., to a previous size and location in the display), to convert a frame to a window in a display, to convert a window to a frame in a display, to move a cursor in a display, to select or highlight an object in a display, to open and/or execute an object in a display, to create a "rubberband" box object in a display, to undo a previous operation, to redo an undone operation, to play, pause, or stop a media stream, to skip, fast forward, or rewind within a media stream, to increase or decrease audio volume, to mute audio volume, to tune to another media content carrier channel, to delete a media stream, to create an American Sign Language ("ASL") letter, and to create an ASL word. These user input commands, which may be mapped to gestures that may be acted out by a user, are illustrative only. Additional and/or alternative user input commands may be mapped to gestures in other embodiments.

Gestures defined for use by a user to participate in a multi-user shared display session and/or to otherwise control a display may include categories of gestures. For example, gestures may include one or more authentication gestures configured to be used to request authentication operations (e.g., to login and/or logout to/from a session), one or more session management gestures configured to be used to manage a multi-user shared display session (e.g., to invite, un-invite, block, unblock, and/or transfer another user to/from a session), one or more screen layout gestures configured to be used to manage a layout and/or content of a shared display (e.g., to create, resize, move, delete, maximize, and/or convert a frame or window in a display), one or more screen object control gestures configured to be used to manipulate objects (e.g., graphical assets) in a display (e.g., to move a cursor, to select, highlight, open, or execute an object in a display), one or more media control gestures configured to be used to control media operations (e.g., to play, pause, stop, skip, fast forward, rewind, and/or delete a media stream), one or more data entry controls configured to be used to input text or other data (e.g., to input ASL letters and/or ASL words), or any combination or sub-combination of the above-listed categories of gestures.

Figure 5A:
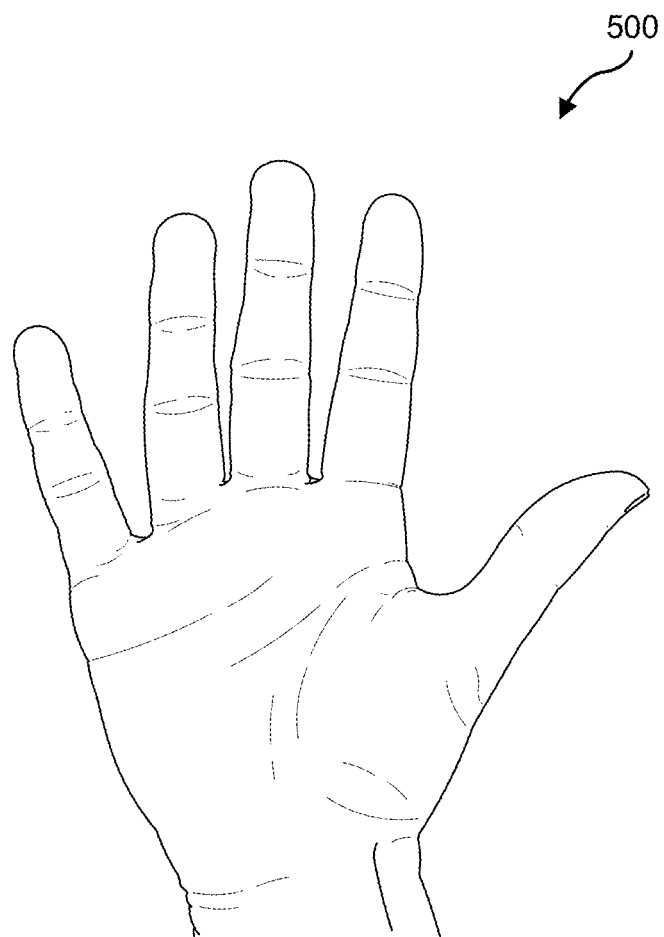
FIGS. 5A-5B illustrate exemplary gestures that may be mapped to user input commands according to principles described herein.
Figure 5B:
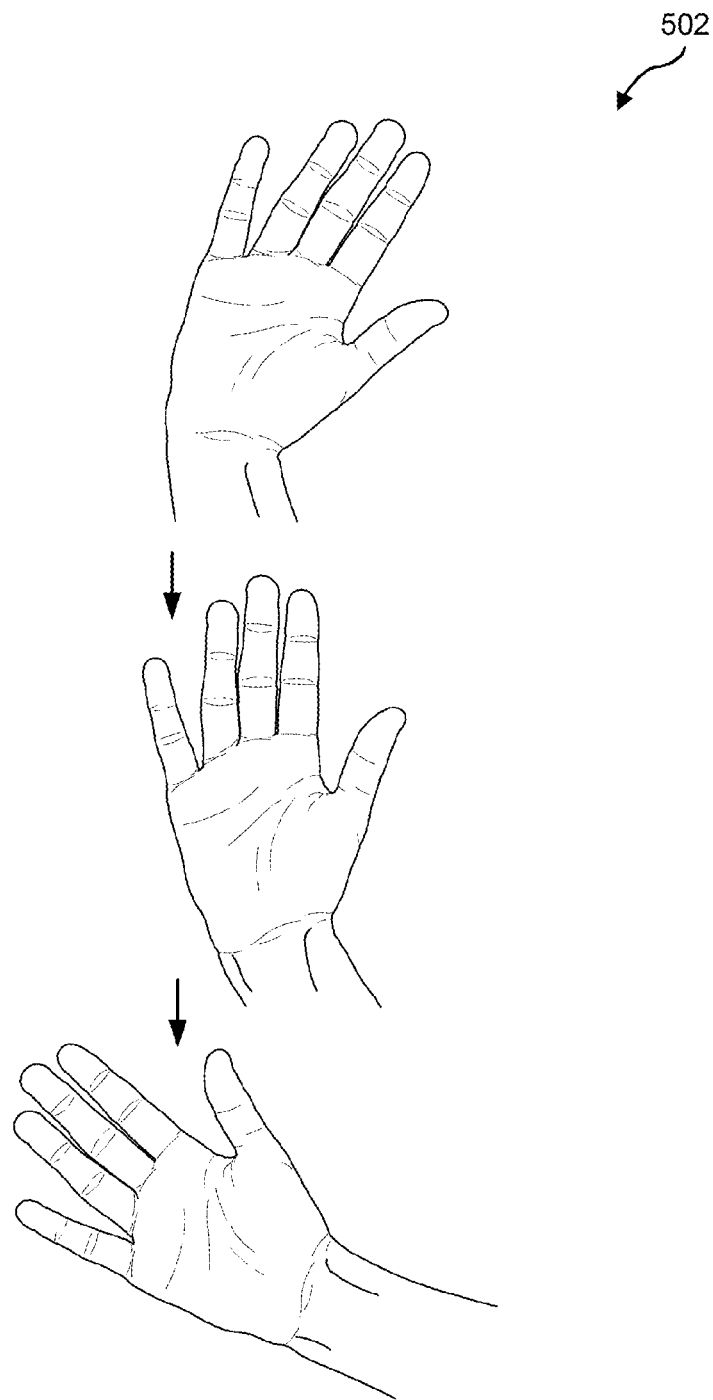

FIGS. 5A-5B illustrate exemplary gestures that may be mapped to user input commands in system 100 and acted out by users to request execution of one or more operations associated with the commands. FIG. 5A illustrates a gesture 500 that includes a user holding up an open hand with the palm of the hand facing display screen 206 of display device 204. Gesture 500 may be mapped to a request to login to a session (e.g., a multi-user shared display session). Accordingly, a user may hold up a hand as shown in FIG. 5A to request to login to a session. The user may hold up the hand for sufficient duration to allow system 100 to recognize gesture 500 and perform an authentication check, an example of which is described further below.

FIG. 5B illustrates a gesture 502 that includes a user holding up and waving an open hand by pivoting the wrist side to side with the palm of the hand facing display screen 206 of display device 204. Gesture 502 may be mapped to a request to logout of a session (e.g., a multi-user shared display session). Accordingly, a user may hold up and wave a hand as shown in FIG. 5B to request to logout of a session. The user should wave the hand at least a predetermined minimum number of times to allow system 100 to recognize gesture 502.

Other exemplary gestures and mappings of the gestures to user input commands are depicted in Table 1. The examples of gestures and corresponding user input commands depicted in Table 1 are illustrative only. Other gestures and/or user input commands may be defined in other embodiments.

TABLE 1

| User Input Command | Gesture |
|---|---|
| Vertically split a selected frame into two frames | User vertically swipes an index finger of a hand from an upward-pointing position to a downward-pointing position |
| Horizontally split a selected frame into two frames | User horizontally swipes an index finger of a hand |
| Select and resize a frame | User points index finger of a hand at a border of a frame in a display, moves the index finger toward the display to select the border of the frame, moves the index finger to request that the selected border of the frame be moved, and withdraws the index finger from the display to request that the frame be resized based on the new position of the moved border |
| Copy and resize window or frame | User reaches a hand toward a window or frame in a display with all five digits of the hand open and pointing to the window or frame, draws all digits together to point to a common location within the window or frame, moves the hand with the digits still drawn together to request that a copy of the window or frame be positioned at a screen location, adjusts the closeness of the digits of the hand to request a resizing of the copy of the window or frame, and withdraws the hand away from the display to request that the copy of the window or frame be released and the operation be completed |
| Move a window or frame | User reaches a hand toward a window or frame in a display with all five digits of the hand open and pointing to the window or frame, with the digits still open (i.e., spaced apart from one another) moves the hand to request that the window or ram be dragged to another position in the display, and withdraws the hand from the display to request that the repositioned window or frame be released at its new position in the display and the operation be completed |
| Resize a window | User reaches a hand toward a window in a display with all five digits of the hand open and pointing to the window, widens or narrows the distance between the tips of the digits of the hand to request that the size of the window be adjusted accordingly, and withdraws the hand from the display to request that the resized window be released and the operation be completed |
| Delete a window or frame | User points an index finger of a hand at a window or frame in a display and draws an "X" with the index finger to request that the window or frame be deleted from the display |
| Maximize a window or frame | User points the index finger of a hand at a window or frame in a display and spirals the index finger clockwise with the spiral expanding outwardly away from the center of the window or frame |
| Restore a window or frame to pre-maximization state (e.g., the size and location of the window or frame pre-maximization) | User points the index finger of a hand at a maximized window or frame in a display and spirals the index finger counter-clockwise with the spiral closing inwardly from the edge of the window or frame |
| Move cursor within a display | User points the index finger of a hand toward a display and moves the hand with the index finger still pointed at the display |
| Select or highlight an object in a display | User points the index finger of a hand toward an object in a display, points the index finger up by pivoting the hand upward at the wrist, and again points the index finger at the object by pivoting the hand back down at the wrist |
| Open or execute an object in a display | User repeats the above-described gesture for selecting or highlighting an object twice in quick succession |
| Create a "rubber-band" box in a display | User pinches the thumb and index finger of a hand together to request that a new "rubber-band" box be created and anchored at a point in a display at which the thumb and index finger point to when first pinched together, moves the hand with the index finger and thumb still pinched to request that a selection rectangle anchored at the point be drawn in the display, and separates the index finger and the thumb to request that the drawn "rubber-band" box be created in the drawing |
| Undo an operation | User points index finger across user's body (e.g., using right hand, a user facing the display points the index finger of the hand to the left) and barrel rolls the index finger and hand in a small circular motion that is counter-clockwise with respect to the direction the index finger is pointing |
| Redo an undone operation | User points index finger across user's body (e.g., using right hand, a user facing the display points the index finger of the hand to the left) and barrel rolls the index finger and hand in a small circular motion that is clockwise with respect to the direction the index finger is pointing |

In certain embodiments, a gesture may be classified as a discrete gesture or a continuous gesture. A discrete gesture may include singe gesture expression that may be acted out one time and for which the corresponding command is immediately applied following the detection of the gesture. An example of a discrete gesture may include gesture 502 shown in FIG. 5B and mapped to a user request to logoff of a session. A continuous gesture may include a series of gestures that are associated with a user input command. For example, a continuous gesture may include an initial gesture expression, which is followed by an intermediate gesture expression, which is followed by a termination gesture expression. Application of a user input command mapped to continuous gesture may begin when the initial gesture expression is detected, continue through the detection of the intermediate gesture expression, and complete when the termination gesture expression is detected. An example of a continuous gesture may include the above-described gesture that is mapped to user request to resize a window in a display.

As described above, system 100 may be configured to visually detect user input, such as gestures performed by one or more users, identify user input commands associated with the detected user input, and apply the user input commands to execute operations associated with the commands. The operations associated with the commands may include any operations that may be performed by system 100, including any of the operations described herein. In certain embodiments, the operations may be associated with the providing and/or controlling of a display and/or content of the display for viewing by one or more users.

As mentioned, system 100 may be configured to allow multiple users to share control of one or more resources associated with a display. For example, multiple users may provide user input within sensing space 210, and system 100 may visually detect the user input, execute a multi-user shared display session, and control, based on a shared session heuristic, how at least one resource associated with the display is shared between users during the multi-user display sharing session.

To illustrate, display subsystem 102 may provide a display on a display screen. One or more resources, including any of the display resources described herein, may be associated with the display. One or more users may provide visual input to control the display provided by display subsystem 102. For example, one or more users may act out gestures within a physical user space (e.g., a physical user space within sensing space 210) associated with the display screen on which the display is shown. Spatial input subsystem 104 may detect the gestures and identify and apply user input commands corresponding with the gestures as described above to control the display. Shared display subsystem 106 may manage the multi-user shared display session and control how resources associated with the display are shared between the users participating in the session.

Figure 6:
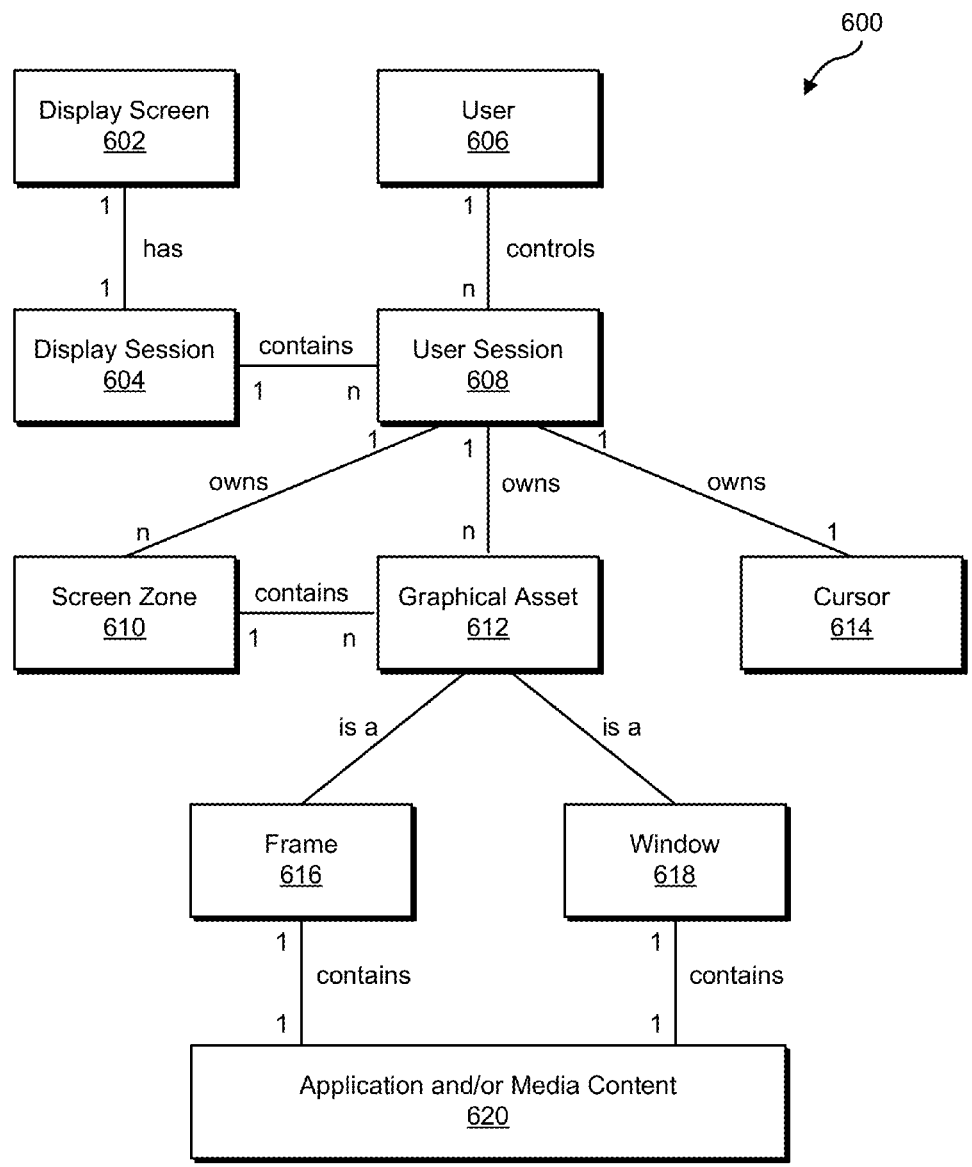
FIG. 6 illustrates an exemplary object class model.

In certain embodiments, shared display subsystem 106 may be configured to utilize an object class model to manage how resources of a display are shared. FIG. 6 illustrates an exemplary object class model 600. As shown in FIG. 6, object class model 600 may include a display screen object class 602, a display session object class 604, a user object class 606, a user session object class 608, a screen zone object class 610, a graphical asset object class 612, a cursor object class 614, a frame object class 616, a window object class 618, and a content object class 620. The object classes may be associated with one another as indicated by the lines interconnecting the object classes in FIG. 6. The object classes and their relationships will now be described in more detail.

Display screen object class 602 may represent a physical display screen on which a display may be shown. Display session object class 604 may represent a display session during which a display is shown on the display screen represented by display screen object class 602. As shown in FIG. 6, there is a one-to-one relationship between display screen object class 602 and display session object class 604 in model 600, which relationship indicates that a single display session is associated with the display screen at a given time. In alternative embodiments, display screen object class 602 may have a one-to-n relationship with display session object class 604 such that multiple display sessions may be associated with a display screen represented by display screen object claim 602.

Display session object class 604 may have a one-to-n relationship with user session object class 608, which indicates that a display session may include one or more user sessions. A display session that contains only a single user session may be referred to as a single-user display session. A display session that contains multiple user sessions may be referred to as a multi-user shared display session and may provide a shared display environment. Exemplary display sessions are described in more detail further below.

User session object class 608 may be associated with user object class 606, which may represent an identity of an authenticated user who may control a user session. As shown in FIG. 6, user object class 606 may have a one-to-n relationship with user session object class 608, which indicates that a user may control one or more user sessions at a given time.

A user session associated with a display (e.g., contained within a display session) may be associated with one or more resources of the display. The resources associated with the user session may comprise a collection of resources that are owned and/or managed by a user who controls the user session. To illustrate, user session object class 608 may have a one-to-n relationship with screen zone object class 610, which indicates that a user session may own one or more screen zones within the display screen (e.g., physical regions of the display screen) on which the display is shown. A screen zone may include a physical region of the display screen. User session object class 608 may also have a one-to-n relationship with graphical asset object class 612, which indicates that a user session may own one or more graphical assets shown in the display. In some examples, user session object class 608 may have a one-to-one relationship with cursor object class 614 as illustrated in FIG. 6, which indicates that a user session may own a single cursor (or pointer or other icon) shown in the display. In other examples, user session object class 608 may have a one-to-n relationship with cursor object class 614 such that a user session may own multiple cursors. Accordingly, a user may have control of multiple cursors shown in a display. For example, two cursors may be shown concurrently in a display, and each hand of a user may be able to control a different one of the cursors. As another example, multiple cursors may be shown concurrently in a display, and each finger of a hand of a user may be used to control a different one of the cursors. Relationships of screen zone object class 610, graphical asset object class 612, and cursor object class 614 with user session object class 608 may be used by shared display subsystem 104 to determine ownership of display resources and to control how the display resources are controlled and/or shared between users associated with user sessions contained with a display session.

As shown in FIG. 6, screen zone object class 610 may have a one-to-n relationship with graphical asset object class 612, which indicates that each screen zone may contain one or more graphical assets displayed therein. In certain embodiments, graphical asset object class 612 may be a frame object class 616 and/or a window object class 618, which indicates that a graphical asset may be a frame or a window shown in the display. A frame may include a fixed logical area that may be tiled in a display. In certain examples, a frame may be resizable but not moveable within the display. A window may include a free logical area that can be moved and resized within a display. Frame object class 616 and window object class 618 each has a one-to-one relationship with an application and/or media content object class 620, which indicates that each frame or window may include application or media content displayed therein. Application content may include application-driven content such as may be generated by an operating system, browser, game, or other application. Media content may include stored or streaming media content such as audio, video, or audio/video content (e.g., broadcast, on-demand, or pay-per-view television content).

Figure 7A:
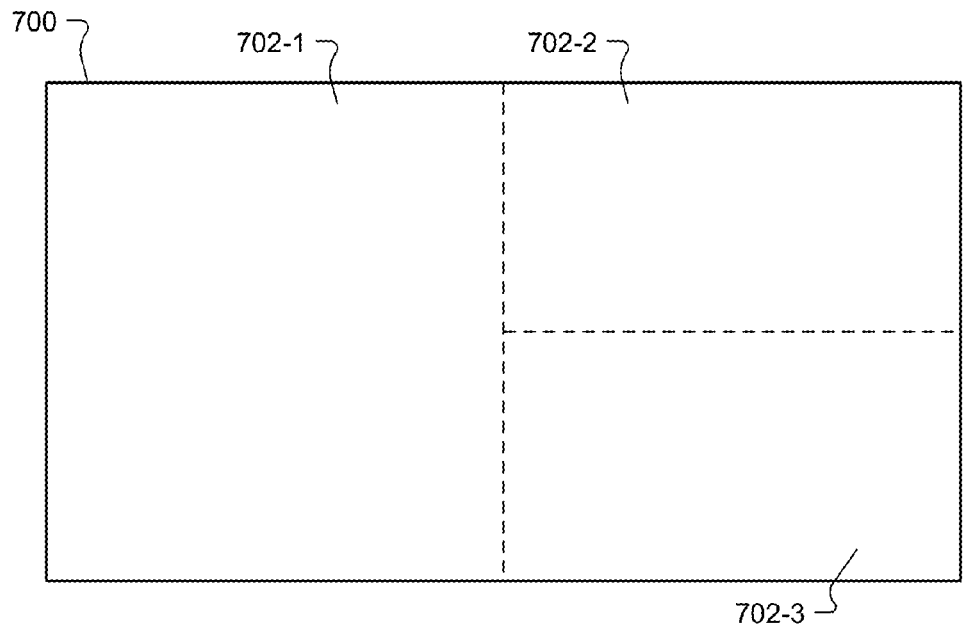
FIGS. 7A-7B illustrate an exemplary display that may be displayed on a display screen during a display session according to principles described herein.
Figure 7B:
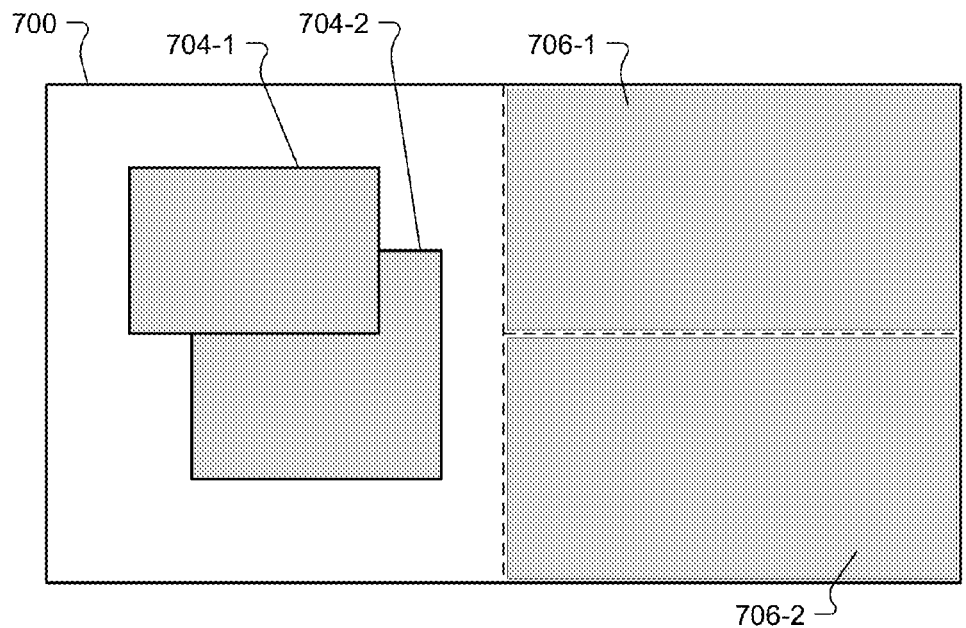

Accordingly, a display shown on a display screen during a display session may include one or more screen zones, graphical assets, and/or cursors owned and/or controlled by one or more users. For example, FIGS. 7A-7B illustrate an exemplary display 700 that may be displayed on a display screen during a display session. The display screen may be divided into screen zones 702 (e.g., screen zones 702-1 through 702-3) as shown in FIG. 7A. In the illustrated example, the screen zones 702 include non-overlapping rectangular regions of the display screen. Each screen zone 702 may be owned by a user who controls a user session included in the display session. A user who owns a screen zone 702 may have full access to the screen zone 702 such that the user may control the screen zone 702 and the display content included in the screen zone 702. For example, the user may create, manipulate, and delete one or more graphical assets within the screen zone 702. FIG. 7B illustrates graphical assets displayed within screen zones 702. As shown, screen zone 702-1 may include windows 704 (e.g., windows 704-1 and 704-2), screen zone 702-2 may include frame 706-1, and screen zone 702-3 may include frame 706-2. Graphical assets such as windows 704 and frames 706 shown in FIG. 7B may contain application and/or media content.

Shared display subsystem 106 may be configured to maintain access permission settings for each resource associated with a display, including for each screen zone 702 associated with the display. The permission settings may designate that a user who owns a screen zone 702 has full access to the screen zone 702, based on the user's ownership of the screen zone 702, such that the user may control the display content included in the screen zone 702. In addition, the permission settings may specify a level of access that another authenticated user participating in a display session may be given to the screen zone 702. For example, the permission settings may specify whether or not another authenticated user is allowed to move his cursor within the screen zone 702 and/or control or otherwise operate on display content within the screen zone 702.

Shared display subsystem 106 may be configured to cause a display session to operate in a collaborative mode and/or a static mode. In a static mode, a user may be provided access only to a screen zone 702 that is owned by the user. Accordingly, in a strictly static mode, each user participating in a display session may be provided access only to the screen zone 702 that is owned by the same user. For example, one user may watch media content presented within one screen zone 702 on the display screen, while another user may be browsing the web and viewing application content presented within another screen zone 702 on the display screen. In a collaborative mode, a user may be provided full access to a screen zone 702 that is owned by the user and partial or full access to at least one other screen zone 702 that is owned by another authenticated user participating in the display session. Accordingly, in collaborative mode, users may interact by controlling display content across screen zones 702. In some examples, a display session may be operated using a combination of one or more collaborative modes and one or more static modes. For example, one or more screen zones 702 within a display may be set to operate in a collaborative mode based on permission settings of the screen zones 702, and one or more other screen zones 702 within the display may be set to operate in a static mode based on permission settings of the other screen zones 702.

Shared display subsystem 106 may be configured to toggle between operating in a collaborative mode and a static mode. For example, access permission settings for a screen zone 702 may be changed in a way that toggles the screen zone 702 between operating in a collaborative mode and a static mode. In certain embodiments, shared display subsystem 106 may be configured to provide a session management tool configured to allow a user to manage a display session such as by inputting one or more access permission settings for a screen zone 702 owned by the user.

Figure 8:
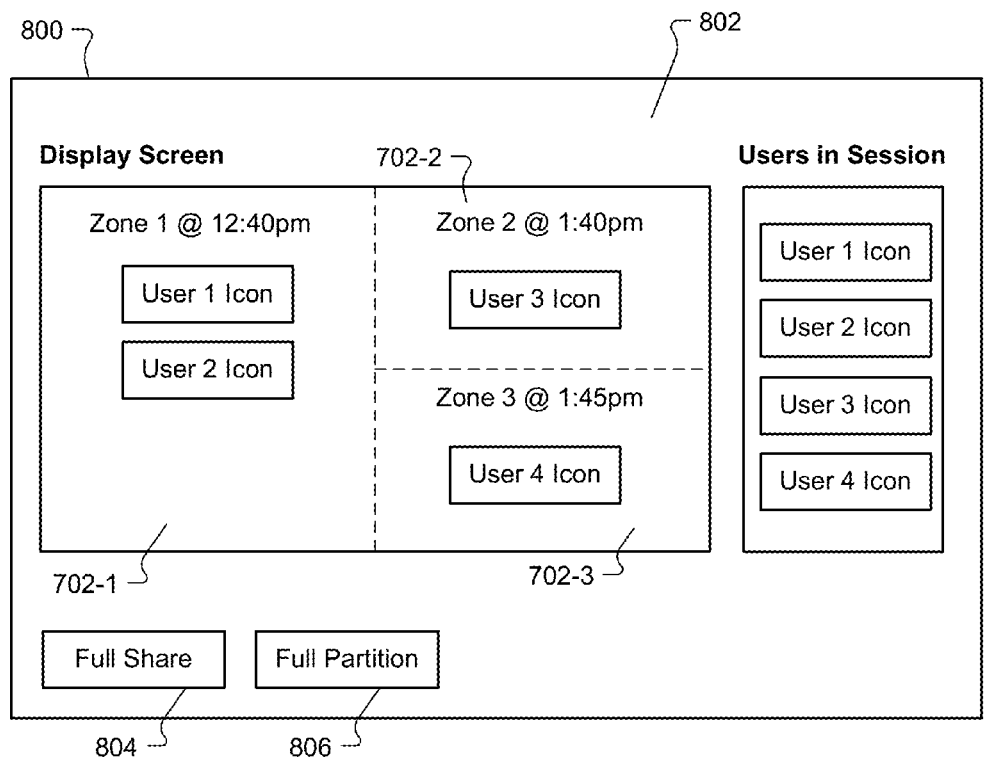
FIG. 8 illustrates an exemplary graphical user interface that may be displayed on a display and may provide a session management tool to a user according to principles described herein.

FIG. 8 illustrates an exemplary graphical user interface ("GUI") 800 that may be displayed on a display and may provide a session management tool 802 to a user. Session management tools 802 may be an extra and/or optional utility made available to end users (e.g., service subscribers) and/or to other users, such as developers of multi-user applications, for use in modeling, managing, or recording multi-user display sessions. Session management tool 802 may be invoked and displayed in GUI 800 in response to user input. As shown in FIG. 8, session management tool 802 may display current configuration information for a display session, including current configuration information for screen zones 702 included in the display session. The screen zone configuration information may indicate physical display screen regions associated with the screen zones 702, times that the screen zones 702 were established, and access permissions settings for the screen zones 702, which may include icons for the users displayed within the screen zones 702 to which the users have access. For instance, an icon for a user referred to as "User 3" is displayed within screen zone 702-2 to represent that the user has permission to access screen zone 702-2. Session management tool 802 may also include information specifying the active users included in the display session.

Using session management tool 802, a user may adjust screen zone settings such as by dragging user icons into and/or out of a screen zone 702 to grant or withdraw the corresponding user's access to the screen zone 702, resize screen zones 702, and/or merge screen zones 702. A user may select a "full share" button 804 in session management tool 802 to set screen zone permission settings to a full collaboration mode or a "full partition" button 806 to set screen zone permission settings to a full static mode. In response to user input received by session management tool 802, shared display subsystem 104 may adjust screen zone settings such as by toggling between a collaborative mode and a static mode in the display session.

Shared display subsystem 106 may be configured to manage display resources by controlling how screen space of a display screen is shared between users. For example, shared display subsystem 106 may control allocation and management of screen space for inclusion in screen zones 702. In certain embodiments, shared display subsystem 106 may be configured to control how screen space is shared based on a shared session heuristic, which may specify one or more rules and/or conditions to be considered when determining how to allocate and/or manage screen space. In certain examples, for instance, the shared session heuristic may specify that screen space is to be allocated evenly between authenticated users participating in a display session. Accordingly, when a new user joins the display session, shared display subsystem 106 may dynamically reallocate screen space by rebalancing the shared screen allocation among the authenticated users in the new user set. The shared session heuristic may specify one or more rules configured to govern the rebalancing of screen space based on, without limitation, a prior display screen layout, user precedence settings, preferred layout settings, and/or specific user preferences (e.g., a user preference specifying preferred positions for screen zones 702 on a display screen). Examples of user precedence settings may include, without limitation, settings indicating that a user who joined the display session first may have precedence over a user who joined the display session later, a user who is a head of a household may have precedence over other users within the household, an account holder of a subscriber account may have precedence over other users associated with the account, and a parent may have precedence over children users within a household).

Figure 9A:
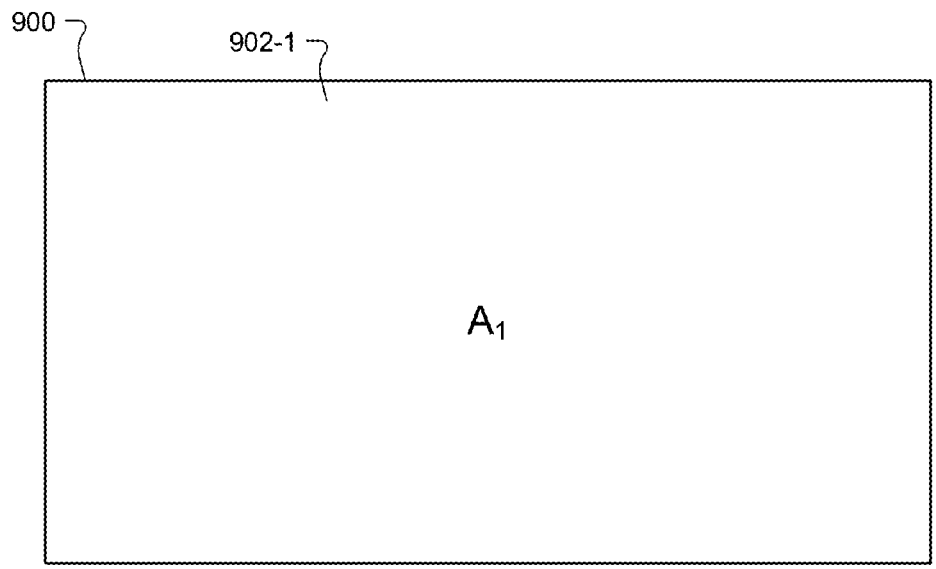
FIGS. 9A-9P illustrate exemplary display views that may be displayed on a display during a display session according to principles described herein.
Figure 9B:
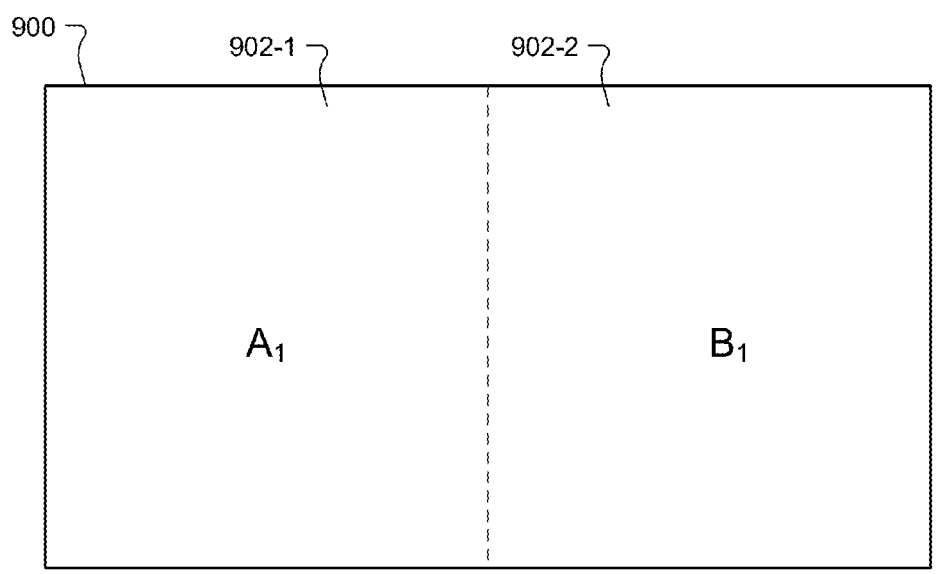
Figure 9C:
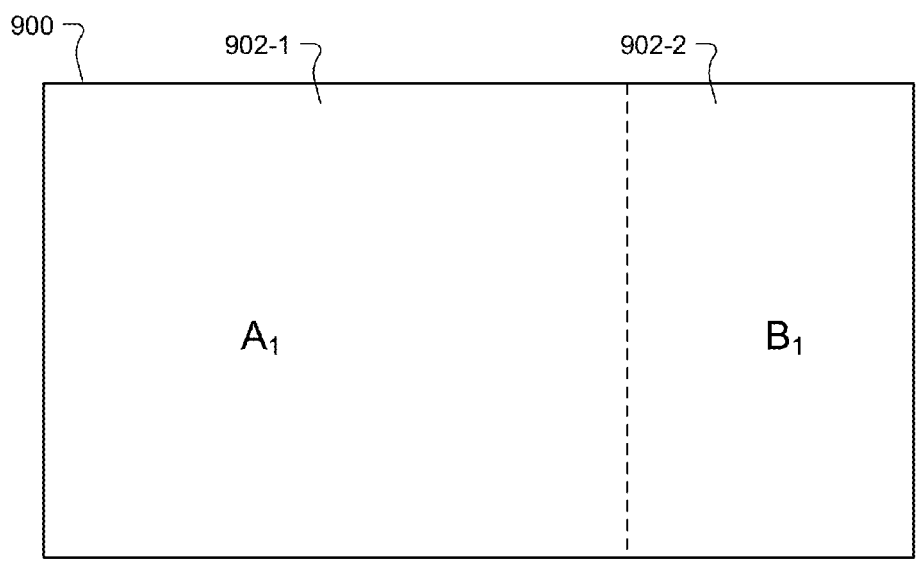
Figure 9D:
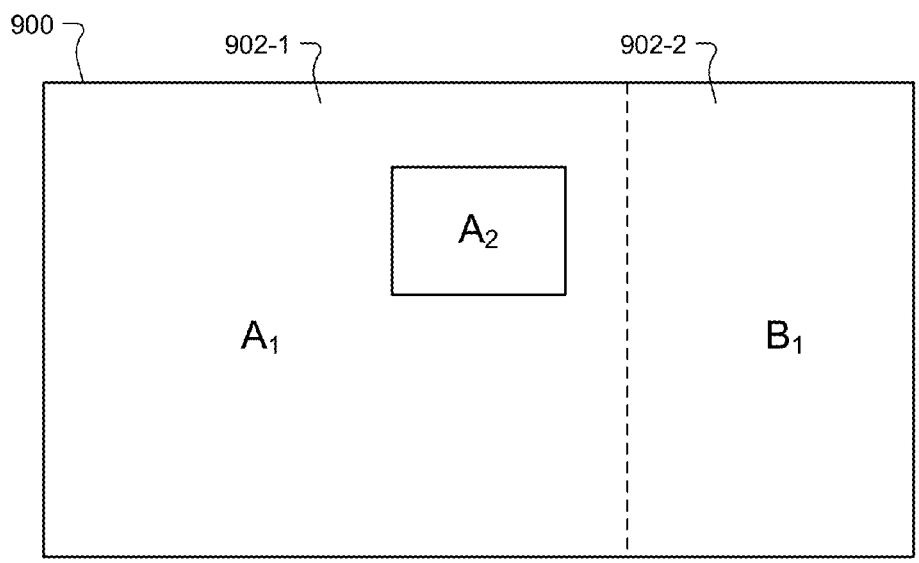
Figure 9E:
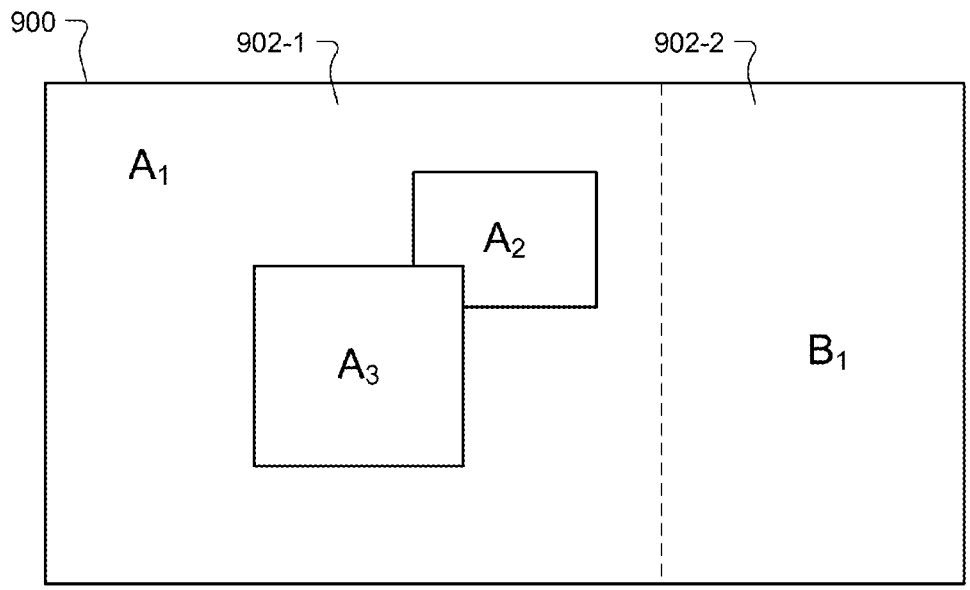
Figure 9F:
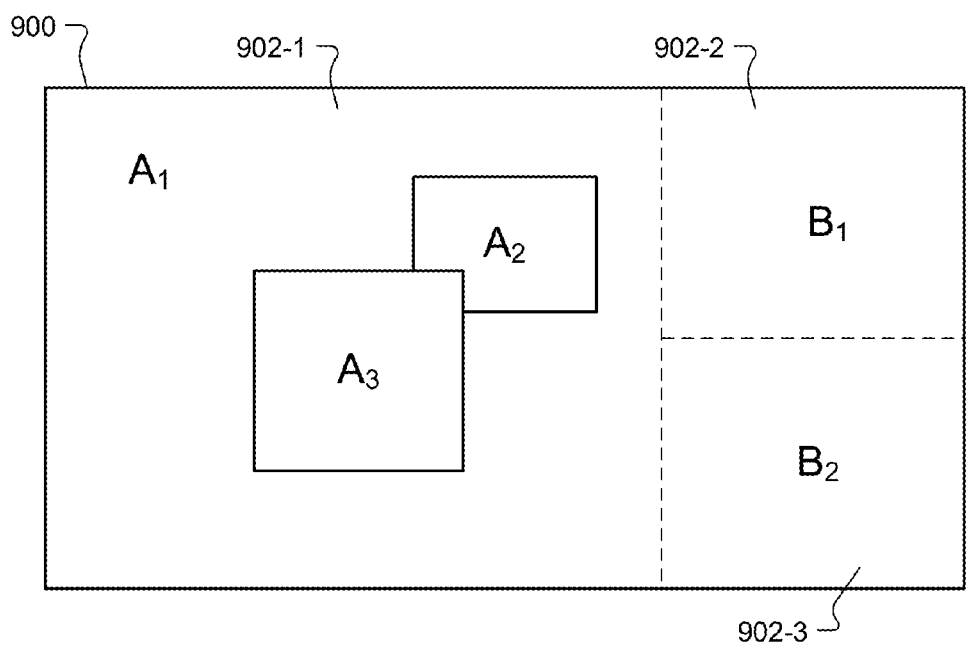
Figure 9G:
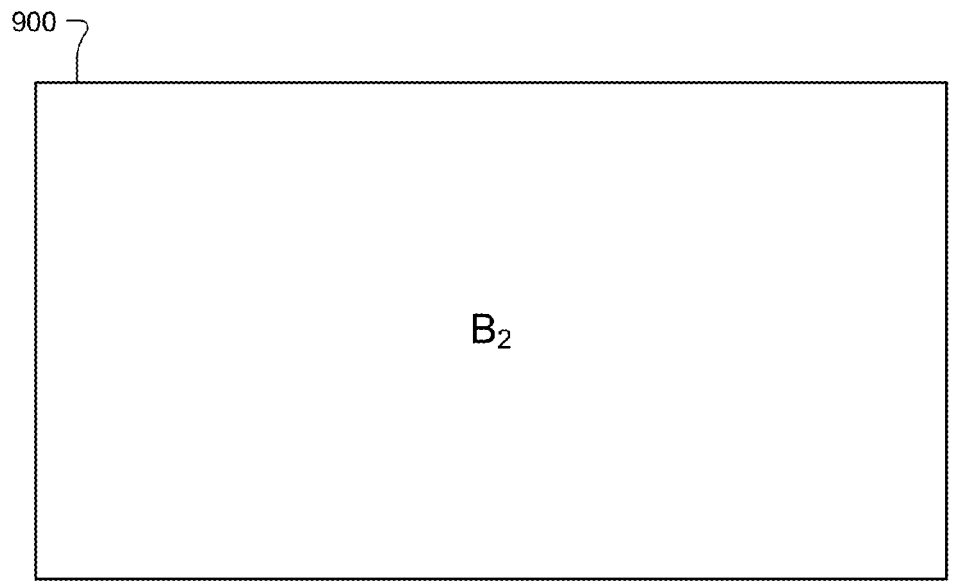
Figure 9H:
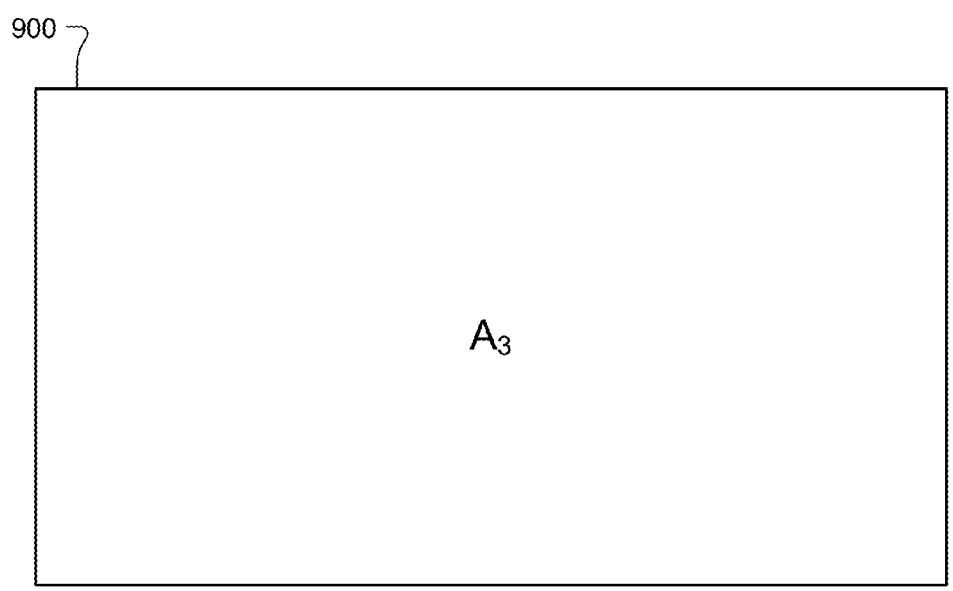
Figure 9I:
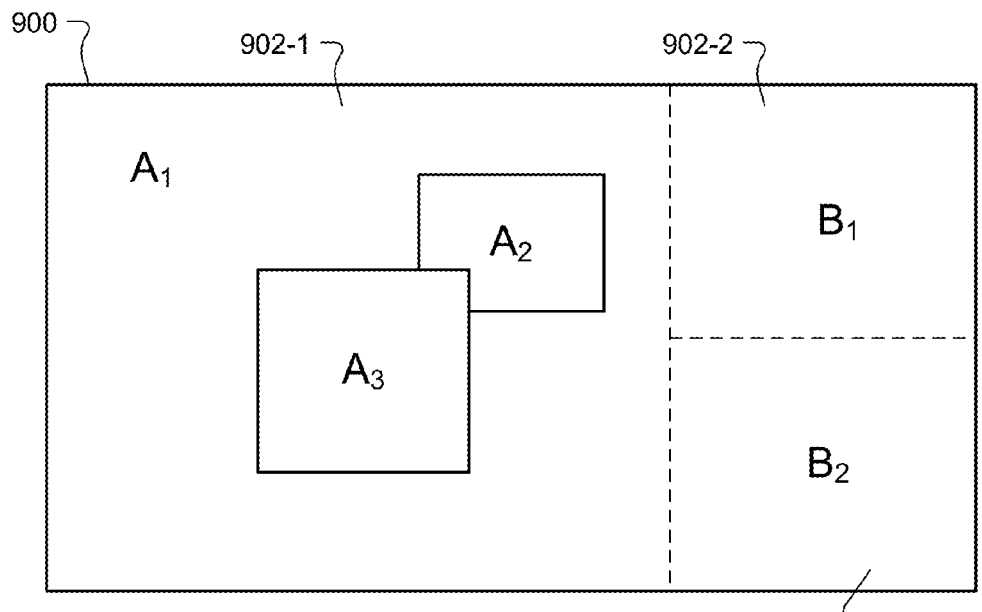
Figure 9J:
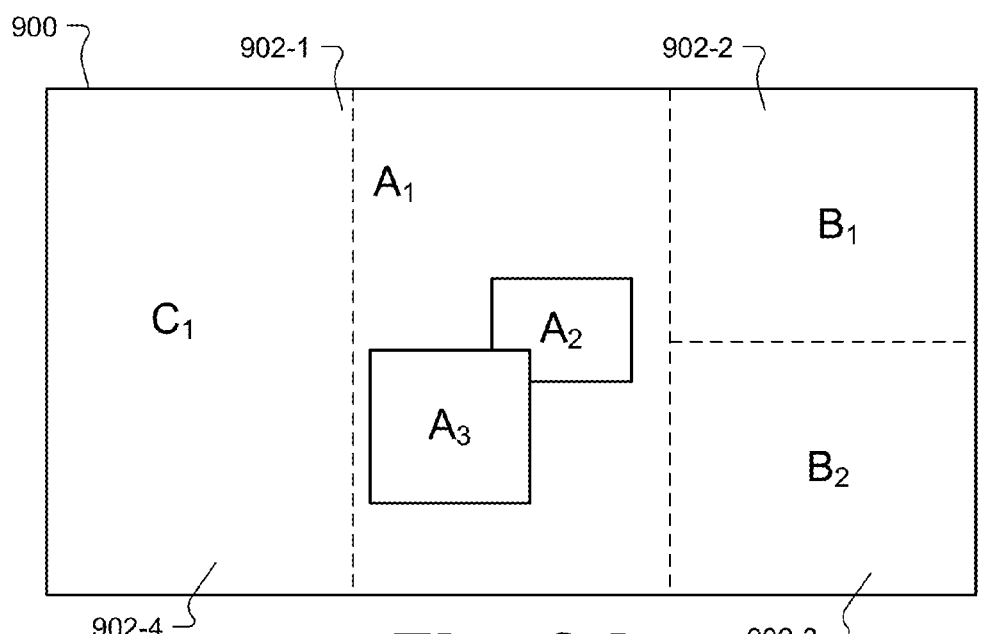
Figure 9K:
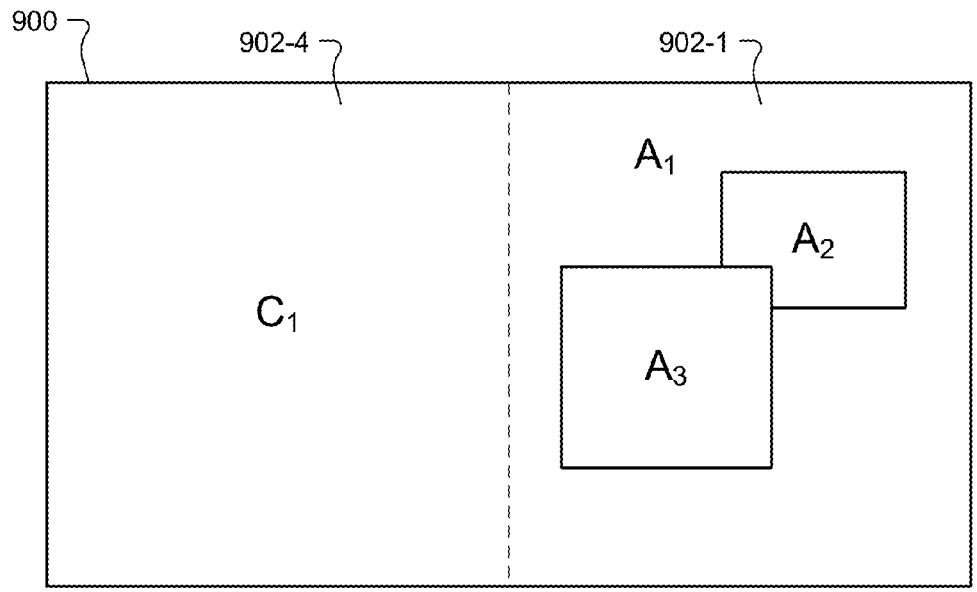
Figure 9L:
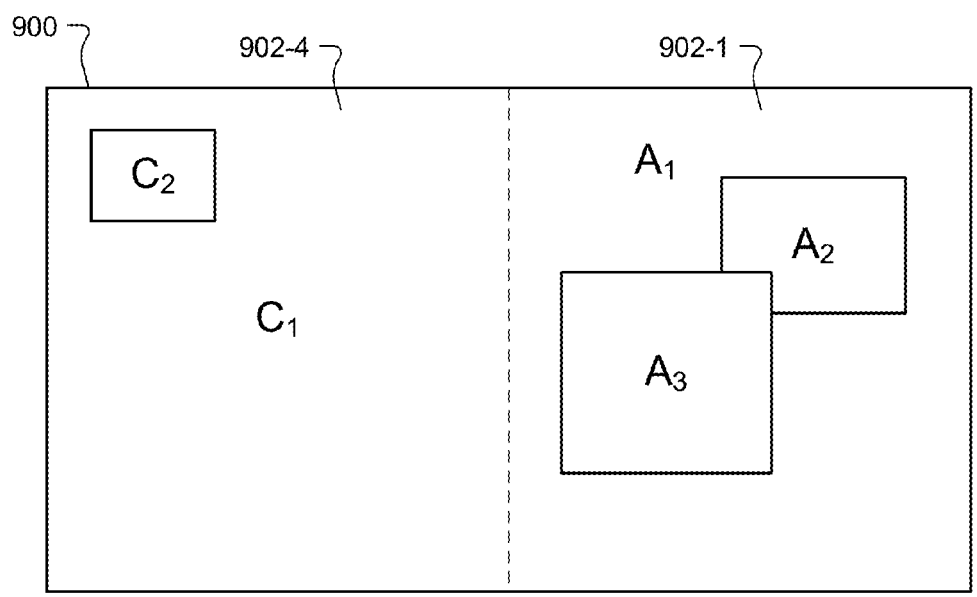
Figure 9M:
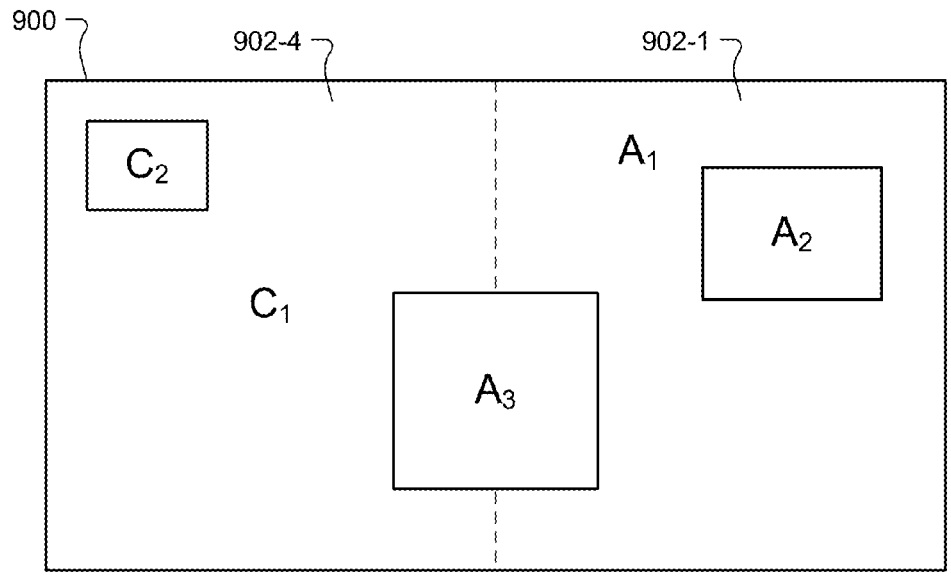
Figure 9N:
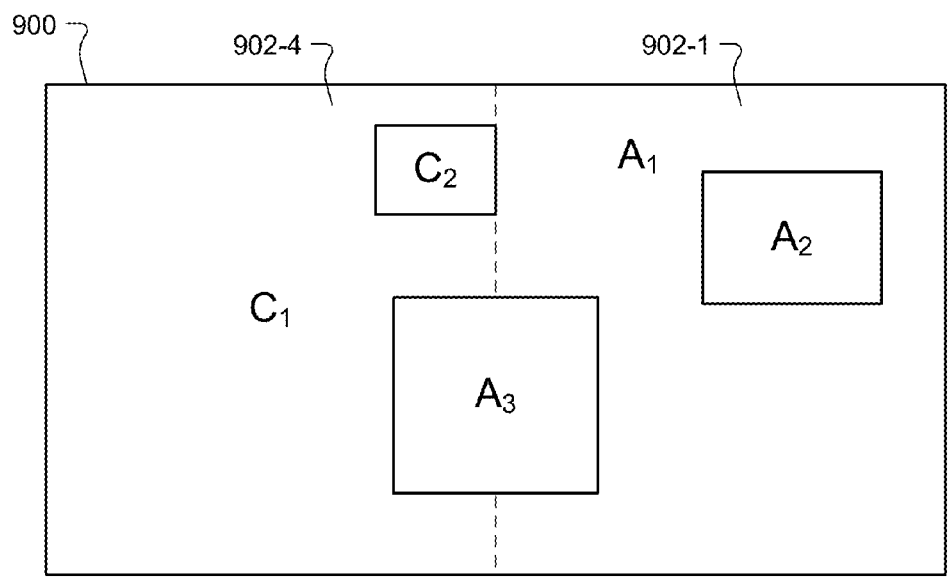
Figure 9O:
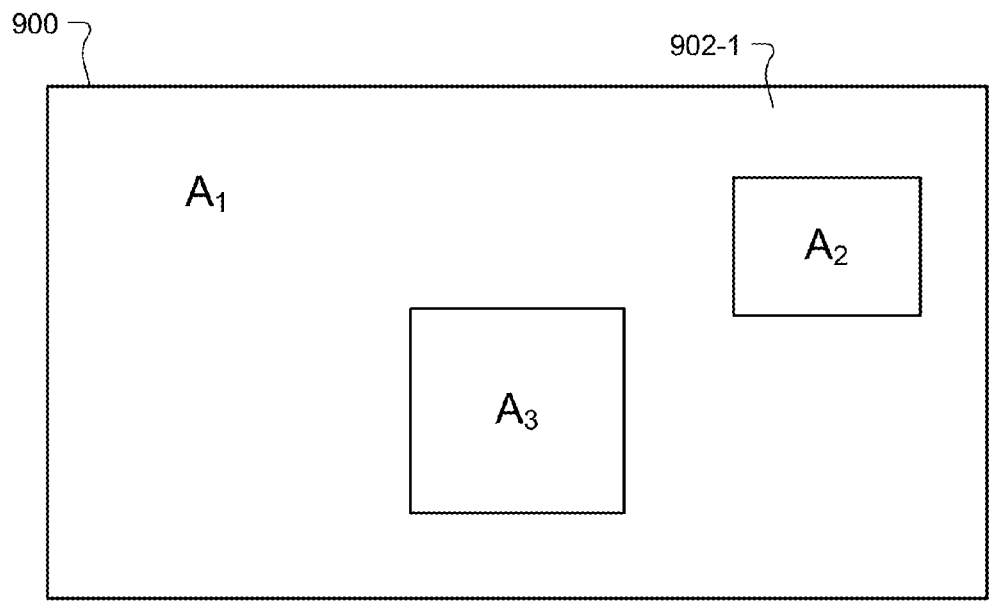
Figure 9P:
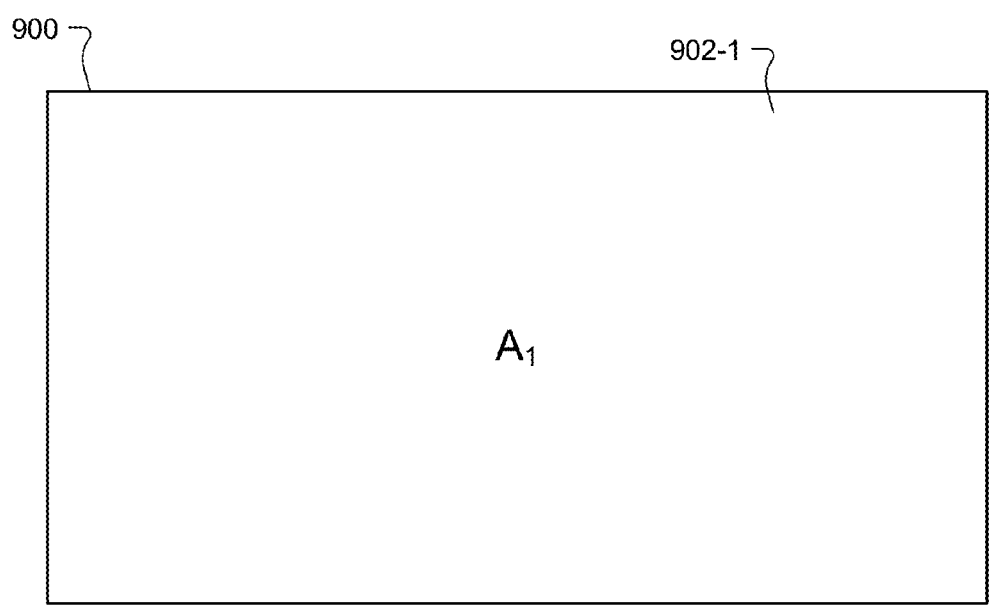

To further facilitate an understanding of how sharing of display resources may be controlled by shared display subsystem 106 during a display session, FIGS. 9A-9P illustrate exemplary display views that may be displayed on a display 900 during a display session. A first user ("User A") may initiate a creation of a new display session by requesting to login to system 100. System 100 may detect the login request, authenticate User A, create a display session, and add User A to the display session. Because User A is the only participant in the display session, shared display subsystem 106 may establish a screen zone 902-1 for User A and allocate the full screen to the screen zone 902-1 owned by User A, as shown in FIG. 9A. A frame "$A_1$" owned by User A may be displayed within screen zone 902-1 to visually depict the screen zone 902-1. Display content may be displayed within frame $A_1$. For example, User A may view media content presented within frame $A_1$.

Next, a second user ("User B") may request to login to system 100. System 100 may detect the login request, authenticate User B, and add User B to the display session. Shared display subsystem 106 may rebalance the screen space of the display screen such as by dividing the screen space into equal screen zones 902-1 and 902-2 owned by User A and User B, respectively, as shown in FIG. 9B. Frame $A_1$ owned by User A may be resized along with screen zone 902-1 to visually depict the resized screen zone 902-1. A frame "$B_1$" owned by User B may be displayed within screen zone 902-2 to visually depict the screen zone 902-2. Display content may be displayed within frames $A_1$ and $B_1$. For example, User A may control and view media content presented within frame $A_1$, and User B may control and view media content presented with frame $B_1$.

Next, User A may request to resize his screen zone 902-1. System 100 may detect the request and determine, based on the shared session heuristic, whether the request will be performed. For example, shared display subsystem 106 may access information in the shared display heuristic to determine whether User A has higher precedence than User B, or whether User B has granted User A permission to control User B's screen zone 902-2. If either determination is affirmative, shared display subsystem 106 may resize screen zones 902-1 and 902-2, as well as frames $A_1$ and $B_1$, such as is shown in FIG. 9C.

Next, User A may request to open windows within his screen zone 902-1. System 100 may detect the request, determine, based on the shared display heuristic, that User A owns screen zone 902-1, and open the windows in screen zone 902-1. FIG. 9D shows a window "$A_2$" displayed in screen zone 902-1. FIG. 9E shows window $A_2$ and another window "$A_3$" displayed together in screen zone 902-1.

Next, User B may request to split his screen zone 902-2 into two parts. For example, User B may wish to watch two media programs at once. System 100 may detect the request, determine, based on the shared display heuristic, that User B owns screen zone 902-2, and split screen zone 902-2 into two screen zones 902-2 and 902-3 as shown in FIG. 9F. Frames "$B_1$" and "$B_2$" shown in FIG. 9F may be displayed within screen zones 902-2 and 902-3 to visually depict the screen zone 902-2 and 902-3.

Next, system 100 may detect a request to maximize frame $B_2$ to fill the entire display screen. For example, User A and User B may agree to focus on frame $B_2$. User A and/or User B may request that frame $B_2$ be maximized. System 100 may determine, based on the shared display heuristic and/or input provided by User A and/or User B, that frame $B_2$ may be maximized as requested. System 100 may then maximize frame $B_2$ to temporarily fill the display screen, as shown in FIG. 9G.

Next, system 100 may detect a request to restore frame $B_2$ to its pre-maximization state and to maximize window $A_3$ to fill the entire display screen. For example, User A and User B may agree to shift the focus of the display from frame $B_2$ to window $A_3$. User A and/or User B may request that frame $B_2$ be restored to its pre-maximization state and that window $A_3$ be maximized. System 100 may determine, based on the shared display heuristic and/or input provided by User A and/or User B, that window $A_3$ may be maximized as requested. System 100 may then restore frame $B_2$ and maximize window $A_3$ to temporarily fill the display screen, as shown in FIG. 9H.

Next, system 100 may detect a request to restore window $A_3$ to its pre-maximization state. For example, User A and User B may agree to return to the screen layout shown in FIG. 9F. User A and/or User B may request that window $A_3$ be restored to its pre-maximization state. System 100 may determine, based on the shared display heuristic and/or input provided by User A and/or User B, that window $A_3$ may be restored as requested. System 100 may then restore window $A_3$ to its previous state in display 900, as shown in FIG. 9I.

Next, a third user ("User C") may request to login to system 100. System 100 may detect the login request, authenticate User C, and add User C to the display session. Shared display subsystem 106 may rebalance the screen space of the display screen such as by equally dividing the screen space between User A, User B, and User C, respectively. As shown in FIG. 9J, screen zone 902-4 owned by User C, screen zone 902-1 owned by User A, and screen zones 902-2 and 902-3 owned by User B occupy an equal amount of screen space. Frame $A_1$, window $A_2$, and window $A_3$ owned by User A may be resized as shown in FIG. 9J to accommodate the rebalancing of screen space between User A, User B, and User C. A frame "$C_1$" owned by User C may be displayed within screen zone 902-4 to visually depict the screen zone 902-4.

Next, User B may request to logout of system 100. System 100 may detect the logout request and remove User B from the display session. Shared display subsystem 106 may rebalance the screen space of the display screen based on user precedence settings specified in the display session heuristic. For example, User A and User C may have equal precedence in the display session heuristic, and, as a result, the screen space allocated to User B before logout may be equally divided between User A and User C. As another example, the screen space allocated to User B before logout may be divided in proportion to the screen space allocated to User A and User C at logout of User B. FIG. 9K illustrates display 900 after screen space has been rebalanced between User A and User C in response to User B logging out of the display session. Frames and windows in the display have been resized accordingly.

Next, User C may request to open a window within his screen zone 902-4. System 100 may detect the request, determine, based on the shared display heuristic, that User C owns screen zone 902-4, and open the window in screen zone 902-4. FIG. 9L shows a window "$C_2$" displayed in screen zone 902-4.

Next, User A may request to move window $A_3$, in part or in whole, from his screen zone 902-1 into User C's screen zone 902-4. System 100 may detect the request and determine, based on the shared display heuristic, whether the request will be performed. For example, shared display subsystem 106 may access information in the shared display heuristic to determine whether User A has higher precedence than User C, or whether User C has granted User A permission to move graphical assets into User C's screen zone 902-4. If either determination is affirmative, shared display subsystem 106 may move window $A_3$ into screen zone 902-4 as shown in FIG. 9M.

Next, User C may request to move window $C_2$ from his screen zone 902-4 to User A's screen zone 902-1. System 100 may detect the request and determine, based on the shared display heuristic, whether the request will be performed. For example, shared display subsystem 106 may access information in the shared display heuristic to determine whether User C has higher precedence than User A, or whether User A has granted User C permission to move graphical assets into User A's screen zone 902-1. If neither determination is affirmative, shared display subsystem 106 may prevent window $C_2$ from being moved beyond the boundary of screen zone 902-4, as shown in FIG. 9N. For example, shared display subsystem 106 may determine, based on the shared display heuristic, that User A has blocked other users from moving graphical assets within User A's screen zone 902-1.

Next, User C may request to logout of system 100. System 100 may detect the logout request and remove User C from the display session. Shared display subsystem 106 may rebalance the screen space of the display screen based on user precedence settings specified in the display session heuristic. In this case, User A is now the sole user participating in the display session, so shared display subsystem 106 may allocate the full screen space to User A. FIG. 9O illustrates display 900 after screen space has been rebalanced to allocate the entire screen space to User A. Frame $A_1$ has been resized along with screen zone 902-1, as shown in FIG. 9O.

Next, User A may request to close windows $A_2$ and $A_3$ within his screen zone 902-1. System 100 may detect the request, determine, based on the shared display heuristic, that User A owns windows $A_2$ and $A_3$, and close the windows $A_2$ and $A_3$, as shown in FIG. 9P.

The above-described sequence of user inputs and management of display 900 shown on a display screen during a display session is illustrative only. Other operations may be performed by system 100 in other examples based on the shared display heuristic and other sequences of user inputs.

To facilitate management of how resources associated with a display are shared between users during a multi-user shared display session, shared display subsystem 106 may be configured to manage user identities, the display session, and the use of display resources. Returning to FIG. 3, for example, when a user requests to login to system 100 as described above, hand recognizer module 302 may pass the request to identity manager module 314, which may authenticate the user. Authentication may be performed in any way suitable to determine the identity of the user who provided the login request. For example, biometric features of a hand of the user may be detected and compared to reference hand data store in hand reference data store 304. If a match is identified, identity manager module 314 may create an association between the visually detected hand of the user and the user identity associated with the matching reference hand data. In this or a similar manner, identity manager module 314 may establish the identity of the user providing input to system 100.

Figure 10:
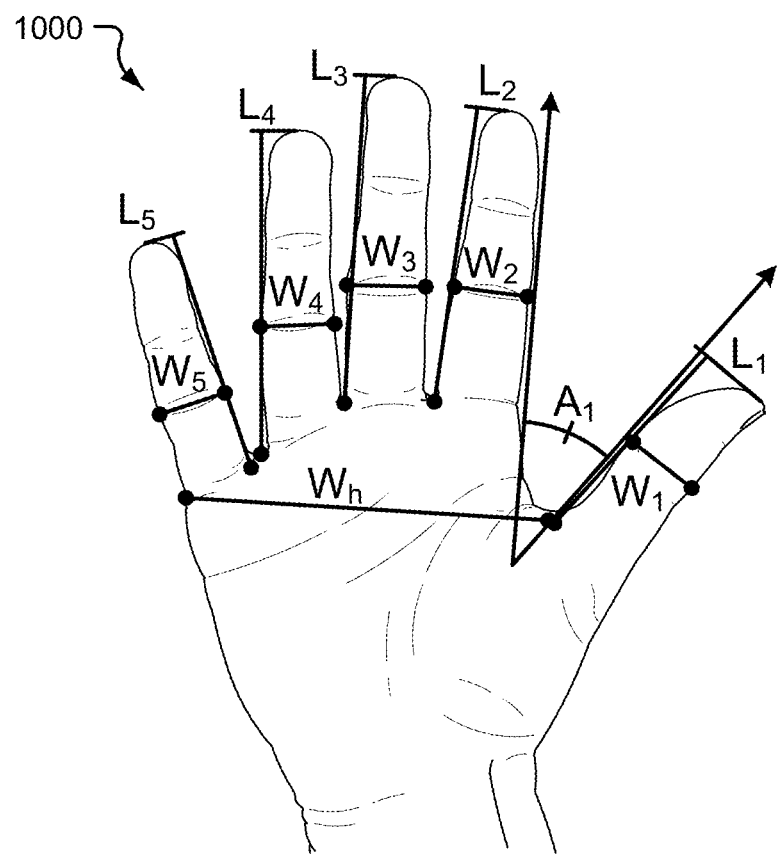
FIG. 10 illustrates exemplary biometric features of a hand that may be used to authenticate a user according to principles described herein.

FIG. 10 illustrates exemplary biometric features of a hand 1000 that may be used to authenticate a user to system 100. The biometric features may be measured based on visual input data and the measurements used to authenticate a user to system 100. In some examples, the measurements may include twelve measurements indicated in association with a depiction of a hand 1000 in FIG. 10. As shown in FIG. 10, the measurements of the hand 1000 may include a relative length L of each digit (e.g., $L_1$-$L_5$), a relative width W of each digit (e.g., $W_1$-$W_5$), a width $W_h$ of the hand 1000, and an angle $A_1$ between the thumb and the index finger of the hand 1000. These measurements are illustrative only. Other measurements and/or biometric features may be used in other embodiments.

Identity manager module 314 may compare the data representative of a detected hand features to reference hand data, which may be stored in hand reference data store 304, to identify a match. When a match is identified, identity manager module 314 may determine a user identity associated with the matching reference hand data and provide data representative of the user identity to session manager module 316. Identity manager module 314 may also generate an association between the detected hand and the user identity.

The above-described determination of a user identity that matches a detected hand may be used to authenticate a user to system 100. However, this is illustrative only. Other user authentication techniques may be employed in other embodiments. For example, fingerprint matching and/or retina scanning may be used to provide a higher level of authentication security.

Once the user is authenticated, identity manager module 314 may pass the login request to session manager module 316, which may either create and add the user requesting login to a new display session if no other user is currently logged in to system 100 or add the user requesting login to an existing display session. Session manager module 316 may then send a new user request to display manager module 318, which may be configured to determine how to allocate display resources in view of the new user request. For example, display manager module 318 may allocate screen space such as a screen zone to the new user based on the shared display heuristic. If the display session is a multi-user shared display session, display manager module 318 may allocate screen space by rebalancing the screen space among the new set of authenticated users participating in the session based on the shared display heuristic. Display manager module 318 may also control, based on the shared display heuristic, how other resources (e.g., display content) associated with the display are shared between users during the display session. Accordingly, the new user may participate together with one or more other users in controlling the display by providing visual input commands to system 100. This may allow users to interact with one another and with display content in a display to produce a shared screen experience.

During a display session, identity manager module 314 may continually track the hand of each authenticated user (e.g. from frame to frame) to ensure that the appropriate user identity remains associated with the correct hand. For example, hand recognizer module 302 may continue to provide data representative of detected images (e.g., captured frames) to identity manager module 314, which may be configured to utilize the data to verify that a tracked hand satisfies a predetermined continuity constraint. The continuity constraint may specify one or more conditions that should be satisfied to ensure that a tracked hand should remain associated with the same user identity. If the predetermined continuity constraint is not satisfied, the user identity of the hand may no longer be verifiable, and session manager module 316 may initiate performance of one or more session management operations. For example, if a hand is no longer detected (e.g., the hand goes out of sensing space 210), or if the hand is moved too quickly within sensing space 210 to satisfy the continuity constraint, session manager module 316 may initiate performance of one or more session management operations that are configured to respond to the detected lack of continuity.

Figure 11:
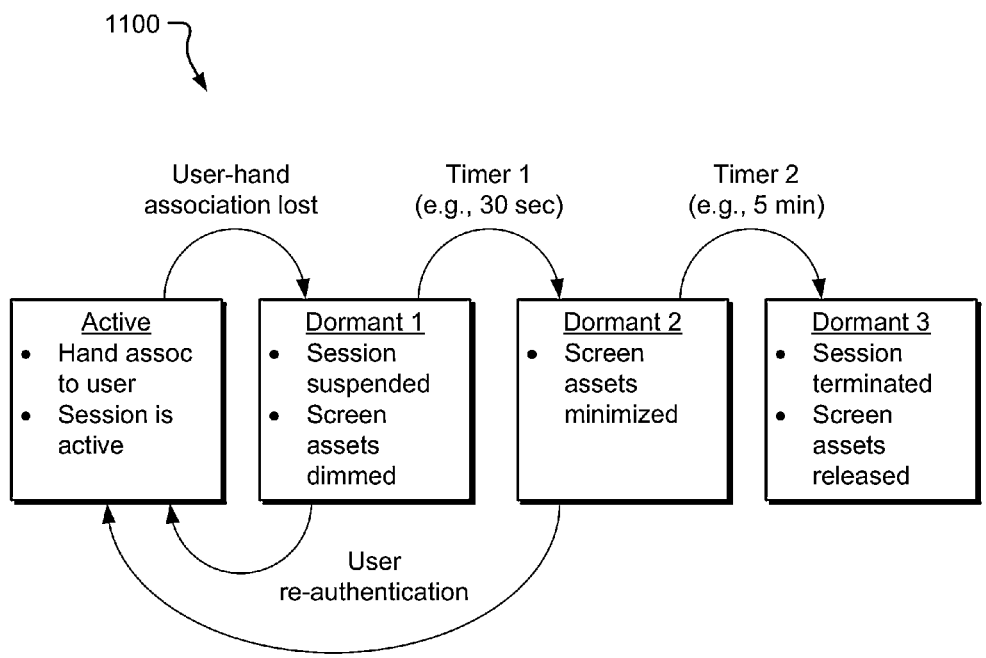
FIG. 11 illustrates an exemplary series of timed downgrade stages according to principles described herein.

As an example, in response to an interruption of hand continuity, identity manager module 314 may be configured to apply one or more timed downgrades to display resources associated with the user identity associated with the hand that has lost continuity. For example, when tracked hand continuity is interrupted, identity manager module 314 may set a status of a user session associated with the hand to a first dormant state. In the first dormant state, the user session may be suspended and graphical assets owned by the user session dimmed in the display. If the user is not re-authenticated within a first time duration after the user session is set to the first dormant state (e.g., thirty seconds after being set to the first dormant state), identity manager module 314 may set a status of the user session to a second dormant state. In the second dormant state, graphical assets owned by the user session may be removed from the display such as by minimizing the assets. If the user is not re-authenticated within a second time duration after the user session is set to the second dormant state (e.g., five minutes after being set to the second dormant state), identity manager module 314 may set a status of a user session associated with the hand to a third dormant state. In the third dormant state, the user session may be terminated and the graphical assets owned by the user session released. FIG. 11 illustrates an exemplary series 1100 of the above-described timed downgrades.

The above-described session management operations that may be performed in response to a detected interruption to hand continuity are illustrative only. Other operations may be performed when continuity of hand tracking is lost in other embodiments.

Session manager module 316 may be configured to create, manage, and terminate a display session and one or more user sessions included in the display session. To this end, session manager module 316 may add user sessions to a display session, remove user sessions from a display session, and maintain a register of authenticated users who have user sessions included in a display session.

Display manager module 318 may be configured to determine, based on the shared session heuristic, whether and/or how to apply user input commands received from command generator module 310. Display manager module 318 may also control how display resources are shared and/or used in a display, based on the shared session heuristic. Display manager module 318 may be configured to implement and/or maintain the shared session heuristic, which, in certain embodiments, may include data representing a set of rules for governing the application of user input commands and/or the use of display resources during a multi-user shared display session. The set of rules may include, without limitation, display screen geometry rules configured to govern whether frames or windows are used in a display and whether to maintain fixed aspect ratios of screen zones, frames, or windows (e.g., to support playback of video content having a fixed aspect ratio within a screen zone, frame, or window that is sized in accordance with the fixed aspect ratio), screen space allocation rules configured to govern how screen space is allocated and/or re-allocated among users, asset permission rules configured to govern which users have control, explicit or implicit, of display content such as graphical assets in a display, user precedence rules configured to govern which users and/or user requests are to be given precedence (e.g., based on fixed user priorities and/or order of user entry into a display session), session management rules configured to govern how display sessions are established, managed, and terminated and how users are added to and/or removed from display sessions, user request rules configured to govern how user requests are accepted, applied, and/or rejected, quality-of-service ("QoS") rules configured to govern operations so as to comply with QoS standards (e.g., by specifying how finite bandwidth is shared among multiple users when a sum of requests exceeds the available bandwidth), and any combination or sub-combination of the above rules.

As mentioned, asset permission rules may be used by display manager module 318 to determine which users are allowed to manipulate graphical assets such as windows and frames in a shared display. To this end, in certain embodiments, a permission descriptor may be attached to each graphical asset. For each graphical asset associated with a multi-user display session, for example, display manager module 318 may instantiate a permission descriptor for each non-owner user participating in the session (i.e., for each user other than the owner of the graphical asset). Accordingly, the permission descriptor associated with a graphical asset may specify permissions to be granted and/or denied to other users for interacting with the graphical asset.

As an example, in certain embodiments, a permission descriptor may include a vector of four variables including a cursor entry variable, a screen space allocation variable, a content control variable, and an existence control variable. The cursor entry variable may be set to a value to indicate whether a given user is allowed to move his cursor into the associated graphical asset. The screen space allocation variable may be set to a value to indicate whether a given user is allowed to modify the screen space occupied by the associated graphical asset (e.g., by moving, resizing, minimizing, or maximizing the graphical asset). The content control variable may be set to a value to indicate whether a given user is allowed to operate on application and/or media content displayed within the associated graphical asset (e.g., by executing application and/or media content operations). The existence control variable may be set to a value to indicate whether a given user is allowed to create and/or delete an associated graphical asset.

To illustrate, a permission descriptor may be defined as $P_u$=(cursor entry, screen space allocation, content control, existence control), where u represents a given user to whom the permission descriptor applies. A graphical asset that is completely unconstrained to user u may be associated with a permission descriptor defined as $P_u$=(1, 1, 1, 1). In this case, user u may be allowed to perform any operation on the graphical asset, which may represent a full collaboration mode of operation. Conversely, a graphical asset that is fully restricted to user u may be associated with a permission descriptor defined as $P_u$=(0, 0, 0, 0). In this case, user u may be prevented from performing any operation on the graphical asset, which may represent a static mode of operation. As another example, a permission descriptor defined as $P_u$=(1, 1, 1, 0) may allow user u to perform any operation on the associated graphical asset except for making new copies of or deleting the graphical asset. As yet another example, a permission descriptor defined as $P_u$=(1, 0, 0, 0) may allow user u only to move his cursor into the graphical asset (e.g., to highlight content shown in the graphical asset).

Permission rules may be set statically or dynamically by display manager module 318 for graphical assets associated with a display session. For example, permission rules may be set to default values based on a type of a graphical asset when the graphical asset is added to a display. As another example, system 100 may set and/or modify permission rules based on user input. For example, using session management tool 802 shown in FIG. 8, a user may provide input to modify permission settings for a screen zone and/or any other graphical asset associated with a display.

As mentioned, interface subsystem 108 may be configured to provide one or more interfaces between display subsystem 102, spatial input subsystem 104, shared display subsystem 106, and any computing hardware, firmware, and/or software associated with system 100. For example, interface subsystem 108 may include OS object manager module 320 and media stream manager module 322, which may be configured to connect one or more other modules shown in FIG. 3 to an operating system and media stream, respectively. For example, OS object manager module 320 may be configured to communicate with a local and/or a remote operating system to manage graphical assets (e.g., windows, frames, cursors, tools, etc.) that may be rendered in a display. Media stream manager module 322 may be configured to communicate with one or more media controllers to select media sources and control one or more operations on a media stream (e.g., play, pause, stop, skip, fast forward, rewind, volume increase and/or decrease, mute, delete, etc.).

Figure 12:
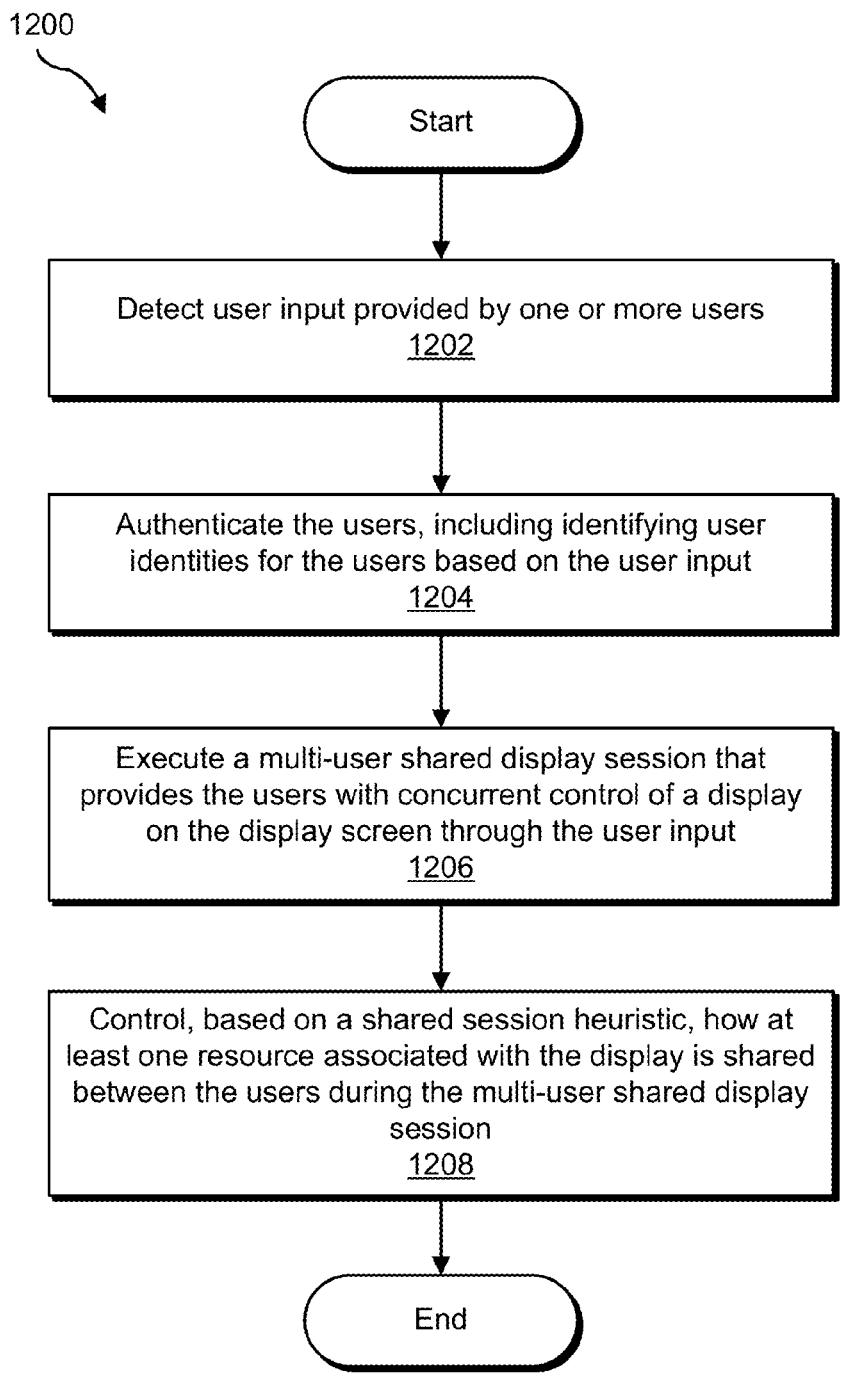
FIGS. 12-13 illustrate exemplary methods of providing a spatial-input-based multi-user shared display experience according to principles described herein.

FIG. 12 illustrates an exemplary method 1200 of providing a spatial-input-based multi-user shared display experience. While FIG. 12 illustrates exemplary steps according to one embodiment, other embodiments may omit, add to, reorder, and/or modify any of the steps shown in FIG. 12. In certain embodiments, one or more of the steps shown in FIG. 12 may be performed by system 100.

In step 1202, user input provided by one or more users may be detected. Step 1204 may be performed in any of the ways described herein. For example, spatial input subsystem 104 may visually detect user input such as one or more hand gestures made by users within a physical user space associated with a display screen.

In step 1204, the users are authenticated. Step 1204 may be performed in any of the ways described herein, including by identifying user identities for the users based on the detected user input.

As part of or in addition to the authentication performed at step 1204, one or more additional operations may be optionally performed at or following step 1204. For example, associations between the hands providing user input and the identified user identities may be created. In addition, a continuity of each hand used to provide the input may be tracked and used to ensure that the associations between the hands and the user identities remain accurate. Accordingly, system 100 may manage display sessions and/or allocations of display resources based at least in part on the user identities associated with hands providing user input.

In step 1206, a multi-user shared display session may be executed. The multi-user shared display session may be configured to provide the users with concurrent control of a display on a display screen through user input. Step 1206 may be performed in any of the ways described above.

In step 1208, how at least one resource associated with the display is shared between the users during the multi-user shared display session may be controlled based on a shared session heuristic. Step 1208 may be performed in any of the ways described above. For example, shared display subsystem 106 may control, based on the shared session heuristic, how at least one resource, such as screen space of the display screen, screen zones, and/or display content associated with the display is shared between the users during the session.

Figure 13:
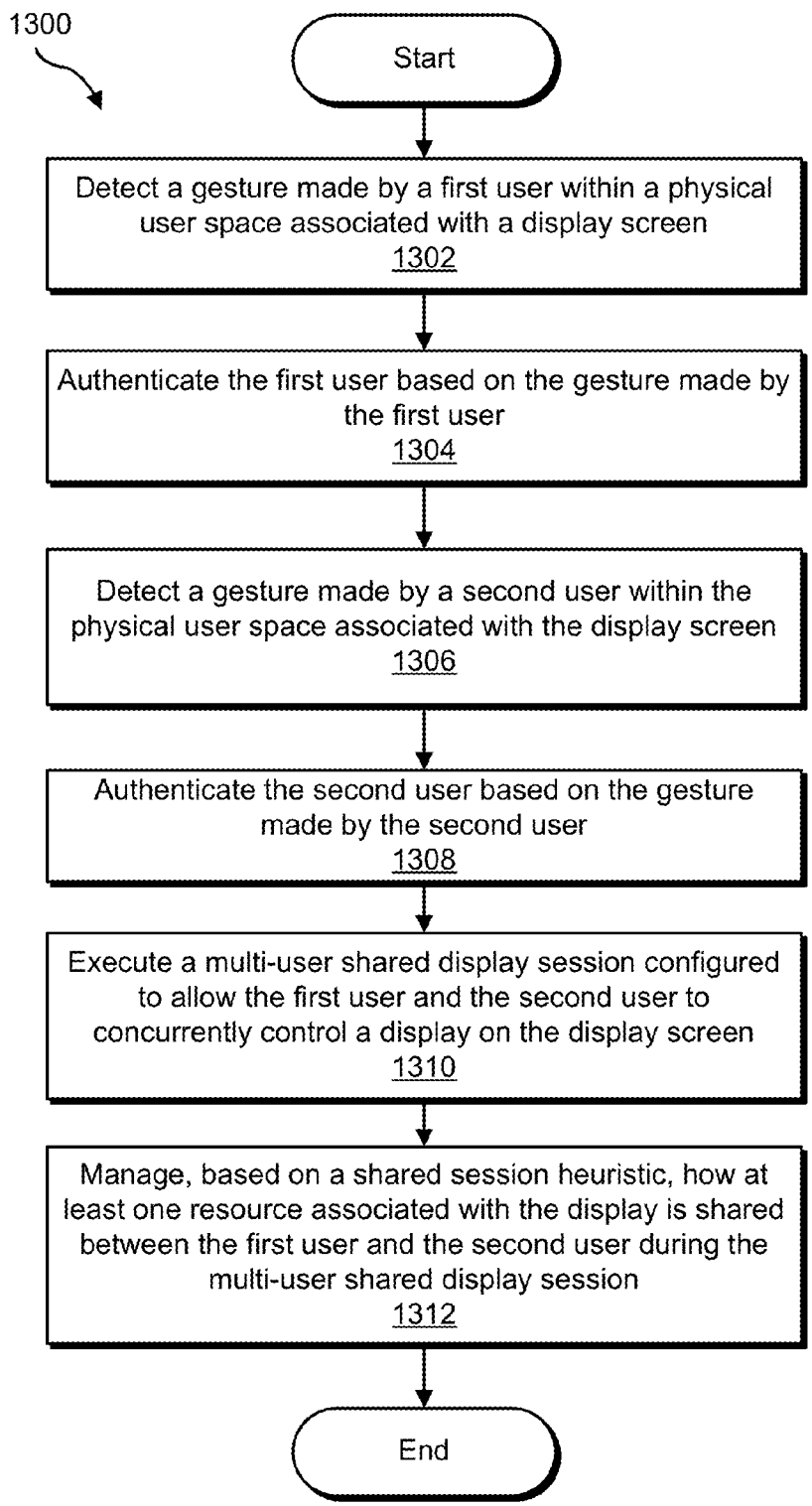

FIG. 13 illustrates an exemplary method 1300 of providing a spatial-input-based multi-user shared display experience. While FIG. 13 illustrates exemplary steps according to one embodiment, other embodiments may omit, add to, reorder, and/or modify any of the steps shown in FIG. 13. In certain embodiments, one or more of the steps shown in FIG. 13 may be performed by system 100.

In step 1302, a gesture made by a first user within a physical user space associated with a display screen may be detected. Step 1302 may be performed in any of the ways described above. For example, spatial input subsystem 104 may visually detect a gesture made by the first user within the physical user space associated with the display screen. In certain examples, the gesture may be associated with a login request.

In step 1304, the first user may be authenticated based on the gesture made by the first user. Step 1304 may be performed in any of the ways described herein, including by identifying a user identity based on the gesture made by the first user.

In step 1306, a gesture made by a first user within the physical user space associated with the display screen may be detected. Step 1306 may be performed in any of the ways described above. For example, spatial input subsystem 104 may visually detect a gesture made by the second user within the physical user space associated with the display screen. In certain examples, the gesture may be associated with a login request.

In step 1308, the second user may be authenticated based on the gesture made by the second user. Step 1308 may be performed in any of the ways described herein, including by identifying a user identity based on the gesture made by the second user.

In step 1310, a multi-user shared display session may be executed. The multi-user shared display session may be configured to allow the first user and the second user to concurrently control a display on a display screen in any of the ways described herein.

In step 1312, how at least one resource associated with the display is shared between the first user and the second user during the multi-user shared display session may be managed based on a shared session heuristic. Step 1312 may be performed in any of the ways described herein. For example, shared display subsystem 106 may manage, based on the shared session heuristic, how at least one resource, such as screen space, screen zones, and/or display content associated with the display is shared between the first user and the second user during the multi-user shared display session.

For example, in step 1312, the sharing of screen space may be managed by dividing the screen space of the display screen into a first screen zone and a second screen zone and providing the first user control of the first screen zone and the second user control of the second screen zone. In addition, access permissions for the first screen zone may be set and may specify a level of access that the second user is to be given to the first screen zone. Similarly, access permissions for the second screen zone may be set and may specify a level of access that the first user is to be given to the second screen zone. As described above, such access permissions may be modified by a user utilizing session management tool 802.

One or more steps shown in FIG. 13 may be repeated for additional users providing gestures within the physical user space. For example, a gesture made by a third user within the physical user space may be detected (e.g., visually detected), and the third user may be authenticated based on the gesture made by the third user. In certain examples, the gesture may include a login request. Accordingly, in response to the gesture, the third user may be added to the multi-user shared display session to allow the third user to control the display on the display screen by providing subsequent gestures within the physical user space. An allocation of the screen space between the first user and the second user may be dynamically rebalanced to allocate the screen space between the first user, the second user, and a third user. The screen space of the display screen may be similarly rebalanced each time a user is added to or removed from the multi-user shared display session.

In certain implementations, any of the steps shown in method 1200 or 1300 of FIGS. 12-13 may be part of an event loop in which any of the steps may be performed at any time within the event loop. To this end, each step may be associated with a callback handler configured to facilitate performance of the corresponding step within the event loop.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a spatial input subsystem that includes at least one sensing device that detects hand gestures made by a plurality of hands of a plurality of users within a physical user space associated with a display screen; and
    a shared display subsystem, including a processor, communicatively coupled to the spatial input subsystem and that
    authenticates the plurality of users by identifying a plurality of user identities-based on physical characteristics of the plurality of hands of the plurality of users, the plurality of user identities corresponding to the plurality of users, executes a multi-user shared display session that provides the plurality of
    authenticated users with concurrent control of a display on the display screen, and controls how at least one resource associated with the display is shared between the plurality of authenticated users during the multi-user shared display session, wherein:
    the at least one resource associated with the display comprises a screen space of the display screen; and
    the shared display subsystem controls how the screen space of the display screen is shared between the plurality of authenticated users by
    dividing the screen space of the display screen into a plurality of non-overlapping screen zones, and
    granting, based on a shared session heuristic that specifies a set of screen space allocation rules governing how the screen space is allocated among the authenticated users, each authenticated user within the plurality of authenticated users control of a different screen zone within the plurality of non-overlapping screen zones.

2. The system of claim 1, wherein the physical characteristics comprise measured biometric features that include at least one of a length, a width, and an angle of the plurality of hands, the length comprises a relative length of each of five digits on each of the plurality of hands, the width comprises at least one of a relative width of each of the five digits on each of the plurality of hands and a width of each of the plurality of hands, and the angle comprises an angle between a thumb and an index finger of each of the plurality of hands.

3. The system of claim 2, wherein the shared display subsystem identifies the plurality of user identities based on the measured biometric features of the plurality of hands by comparing the measured biometric features of the plurality of hands to a plurality of reference hand models associated with the plurality of user identities.

4. The system of claim 1, wherein the shared session heuristic further specifies at least one of:
    a set of asset permission rules governing which of the authenticated users has control of display content in the display; and
    a set of user precedence rules governing priorities among the authenticated users.

5. The system of claim 1, wherein the shared display subsystem controls how the screen space associated with the display is shared by dynamically re-allocating the screen space during the execution of the multi-user shared display session in response to at least one of a request to add a new user to the multi-user shared display session and a request to remove one of the plurality of authenticated users from the multi-user shared display session.

6. The system of claim 1, wherein the shared display subsystem sets one or more permissions settings for the plurality of non-overlapping screen zones, the one or more permission settings specifying one or more levels of access to the plurality of non-overlapping screen zones.

7. The system of claim 6, wherein the one or more permissions settings specify one of a full access level of access associated with a full collaboration mode of operation and a full partition level of access associated with a full static mode of operation.

8. The system of claim 7, wherein the shared display subsystem modifies the one or more permissions settings to toggle between the full collaboration mode of operation and the full static mode of operation in response to user input.

9. The system of claim 1, wherein:
    the at least one resource further comprises a graphical asset depicted in the display; and
    the shared display subsystem controls how the graphical asset is shared between the plurality of authenticated users during the multi-user shared display session by
    assigning an authenticated user within the plurality of authenticated users ownership of the graphical asset, and
    assigning the graphical asset a permission descriptor specifying one or more permission rules that govern access to the graphical asset by at least one other authenticated user within the plurality of authenticated users.

10. The system of claim 1, wherein the shared display subsystem provides a session management tool for use by a user within the plurality of authenticated users during the multi-user shared display session, and the session management tool facilitates a user modification of a permission setting for the at least one resource associated with the display.

11. The system of claim 1, wherein the shared display subsystem controls how the at least one resource associated with the display is shared between the plurality of authenticated users during the multi-user shared display session based on an object class model specifying ownership of the at least one resource.

12. The system of claim 1, wherein the shared display subsystem:
    creates associations between the plurality of hands and the plurality of user identities; and
    tracks a continuity of each hand within the plurality of hands to ensure that the associations between the plurality of hands and the plurality of user identities remain accurate.

13. The system of claim 12, wherein the shared display subsystem:
- detects an interruption to the tracked continuity of a hand within the plurality of hands; and
- modifies a status of a user session associated with the user identity associated with the hand in response to the interruption.

14. The system of claim 13, wherein the shared display subsystem modifies the status of the user session by:
- setting the status of the user session to a first dormant status and dimming display content associated with the user session in response to the detected interruption;
- setting the status of the user session to a second dormant status and minimizing the display content owned by the user session after a first time duration after the user session is set to the first dormant state; and
- terminating the user session and releasing the display content owned by the user session after a second time duration after the user session is set to the second dormant status.

15. The system of claim 1, wherein the plurality of non-overlapping screen zones define fixed regions of the display screen.

16. A method comprising:
- detecting, by a multi-user shared display system, hand gestures made by a plurality of hands of a plurality of users within a physical user space associated with a display screen;
- authenticating, by the multi-user shared display system, the plurality of users by identifying a plurality of user identities based on physical characteristics of the plurality of hands, the plurality of user identities corresponding to the plurality of users;
- executing, by the multi-user shared display system, a multi-user shared display session that provides the plurality of authenticated users with concurrent control of a display on the display screen;
- controlling, by the multi-user shared display system, how at least one resource associated with the display is shared between the plurality of authenticated users during the multi-user shared display session, wherein:
- the at least one resource associated with the display comprises a screen space of the display screen; and
- the multi-user shared display system controls how the screen space of the display screen is shared between the plurality of authenticated users by
- dividing the screen space of the display screen into a plurality of non-overlapping screen zones, and
- granting, based on a shared session heuristic that specifies a set of screen space allocation rules governing how the screen space is allocated among the authenticated users, each authenticated user within the plurality of authenticated users control of a different screen zone within the plurality of non-overlapping screen zones.

17. The method of claim 16, embodied as computer-executable instructions on at least one non-transitory computer-readable medium.

18. A method comprising:
- visually detecting, by a multi-user shared display system, a gesture made by a hand of a first user within a physical user space associated with a display screen;
- authenticating, by the multi-user shared display system, the first user based on at least one physical characteristic of the hand of the first user that made the gesture;
- visually detecting, by the multi-user shared display system, a gesture made by a hand of a second user within the physical user space;
- authenticating, by the multi-user shared display system, the second user based on at least one physical characteristic of the hand of the second user that made the gesture;
- executing, by the multi-user shared display system, a multi-user shared display session that provides the authenticated first user and the authenticated second user with concurrent control of a display on the display screen; and
- managing, by the multi-user shared display system, how screen space of the display screen is shared between the authenticated first user and the authenticated second user during the multi-user shared display session;
- wherein the managing of how the screen space is shared comprises:
- dividing the screen space into a first screen zone and a second screen zone that do not overlap one another;
- providing the authenticated first user with control of the first screen zone;
- providing the authenticated second user with control of the second screen zone, the second screen zone different from the first screen zone;
- wherein the providing of the authenticated first user with control of the first screen zone and the providing of the authenticated second user with control of the second screen zone are based on a shared session heuristic that specifies a set of screen space allocation rules governing how the screen space is allocated among the authenticated users.

19. The method of claim 18, wherein the managing of how the screen space is shared further comprises:
- setting access permissions for the first screen zone, the access permissions for the first screen zone specifying a level of access that the authenticated second user has to the first screen zone; and
- setting access permissions for the second screen zone, the access permissions for the second screen zone specifying a level of access that the authenticated first user has to the second screen zone.

20. The method of claim 18, embodied as computer-executable instructions on at least one non-transitory computer-readable medium.

* * * * *